US011114689B2

(12) United States Patent
Makino et al.

(10) Patent No.: US 11,114,689 B2
(45) Date of Patent: Sep. 7, 2021

(54) SOLID ELECTROLYTE COMPOSITION, SOLID ELECTROLYTE-CONTAINING SHEET, ALL-SOLID STATE SECONDARY BATTERY, AND METHODS FOR MANUFACTURING SOLID ELECTROLYTE-CONTAINING SHEET AND ALL-SOLID STATE SECONDARY BATTERY

(71) Applicant: FUJIFILM Corporation, Tokyo (JP)

(72) Inventors: Masaomi Makino, Kanagawa (JP); Tomonori Mimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 102 days.

(21) Appl. No.: 16/286,721

(22) Filed: Feb. 27, 2019

(65) Prior Publication Data
US 2019/0198919 A1 Jun. 27, 2019

Related U.S. Application Data

(63) Continuation of application No. PCT/JP2017/030696, filed on Aug. 28, 2017.

(30) Foreign Application Priority Data

Aug. 30, 2016 (JP) .............................. JP2016-168290

(51) Int. Cl.
*H01M 10/0562* (2010.01)
*H01M 4/04* (2006.01)
*H01M 4/48* (2010.01)
*H01M 4/62* (2006.01)
*H01M 4/36* (2006.01)
*H01M 4/525* (2010.01)
*H01M 4/505* (2010.01)
*H01M 4/131* (2010.01)
*H01M 10/0585* (2010.01)
*H01M 4/133* (2010.01)
*H01M 4/1391* (2010.01)
*H01M 4/1393* (2010.01)
*H01M 10/0525* (2010.01)

(52) U.S. Cl.
CPC ..... *H01M 10/0562* (2013.01); *H01M 4/0404* (2013.01); *H01M 4/0407* (2013.01); *H01M 4/131* (2013.01); *H01M 4/133* (2013.01); *H01M 4/1391* (2013.01); *H01M 4/1393* (2013.01); *H01M 4/364* (2013.01); *H01M 4/48* (2013.01); *H01M 4/505* (2013.01); *H01M 4/525* (2013.01); *H01M 4/62* (2013.01); *H01M 4/622* (2013.01); *H01M 4/623* (2013.01); *H01M 10/0525* (2013.01); *H01M 10/0585* (2013.01); *H01M 2220/30* (2013.01); *H01M 2300/0068* (2013.01)

(58) Field of Classification Search
CPC .... H01M 10/0562; H01M 4/62; H01M 4/623; H01M 4/364; H01M 4/525; H01M 4/505; H01M 4/131; H01M 4/0404; H01M 10/0585; H01M 4/133; H01M 4/1391; H01M 4/1393; H01M 4/0407; H01M 4/48; H01M 4/622; H01M 10/0525; H01M 2220/30; H01M 2300/0068; H01M 4/13; H01M 4/366; H01M 10/052; Y02E 60/10
See application file for complete search history.

(56) References Cited

U.S. PATENT DOCUMENTS

| | | | | |
|---|---|---|---|---|
| 2011/0049745 | A1* | 3/2011 | Katayama | H01M 10/0562 264/104 |
| 2013/0344396 | A1* | 12/2013 | Bosnyak | H01M 10/08 429/307 |
| 2014/0239239 | A1* | 8/2014 | Cha | H01M 4/134 252/519.33 |
| 2014/0302229 | A1 | 10/2014 | Miki | |
| 2015/0380763 | A1* | 12/2015 | Ohtomo | H01M 10/02 429/304 |
| 2016/0204467 | A1* | 7/2016 | Nogami | H01M 10/0525 429/322 |
| 2017/0301950 | A1 | 10/2017 | Mimura et al. | |

FOREIGN PATENT DOCUMENTS

| | | | |
|---|---|---|---|
| JP | 2011-054327 | A | 3/2011 |
| JP | 2013-134825 | A | 7/2013 |
| JP | 2015-201372 | A | 11/2015 |
| JP | 2016-12495 | A | 1/2016 |
| JP | 2016-081905 | A | 5/2016 |

(Continued)

OTHER PUBLICATIONS

Communication dated Jul. 8, 2020, from the Korean Patent Office in application No. 10-2019-7007679.

(Continued)

*Primary Examiner* — Muhammad S Siddiquee
(74) *Attorney, Agent, or Firm* — Sughrue Mion, PLLC

(57) ABSTRACT

Provided are a solid electrolyte composition containing a sulfide-based inorganic solid electrolyte, an active material having a surface coated with an oxide having an ion conductivity, and a dispersion medium, in which the dispersion medium includes a specific polar dispersion medium, a solid electrolyte-containing sheet having a layer containing a sulfide-based inorganic solid electrolyte, an active material having a surface coated with an oxide having an ion conductivity, and a specific polar dispersion medium, an all-solid state secondary battery, and methods for manufacturing a solid electrolyte-containing sheet and an all-solid state secondary battery.

14 Claims, 2 Drawing Sheets

(56) References Cited

FOREIGN PATENT DOCUMENTS

JP       2016-139511 A     8/2016
KR   10-2016-0002364 A     1/2016
WO      2016/129427 A1     7/1919

OTHER PUBLICATIONS

International Search Report dated Sep. 26, 2017, in counterpart International Application No. PCT/2017/030696.
Written Opinion of the International Searching Authority dated Sep. 26, 2017, in counterpart International Application No. PCT/JP2017/030696.
International Preliminary Report on Patentability with translation of Written Opinion dated Mar. 5, 2019, in counterpart International application No. PCT/JP2017/030696.
Communication dated Jul. 26, 2019, from the European Patent Office in corresponding application No. 17846387.3.
Communication dated Feb. 16, 2021, from the European Patent Office in application No. 17846387.3.
Communication dated Dec. 4, 2020, from the Korean Intellectual Property Office in application No. 10-2019-7007679.
Office Action dated Jun. 9, 2021 in Chinese Application No. 201780051704.3.

* cited by examiner

SOLID ELECTROLYTE COMPOSITION, SOLID ELECTROLYTE-CONTAINING SHEET, ALL-SOLID STATE SECONDARY BATTERY, AND METHODS FOR MANUFACTURING SOLID ELECTROLYTE-CONTAINING SHEET AND ALL-SOLID STATE SECONDARY BATTERY

CROSS-REFERENCE TO RELATED APPLICATIONS

This application is a Continuation of PCT International Application No. PCT/JP2017/030696 filed on Aug. 28, 2017, which claims priority under 35 U.S.C. § 119 (a) to Japanese Patent Application No. 2016-168290 filed in Japan on Aug. 30, 2016. Each of the above applications is hereby expressly incorporated by reference, in its entirety, into the present application.

BACKGROUND OF THE INVENTION

1. Field of the Invention

The present invention relates to a solid electrolyte composition, a solid electrolyte-containing sheet, an all-solid state secondary battery, and methods for manufacturing a solid electrolyte-containing sheet and an all-solid state secondary battery.

2. Description of the Related Art

A lithium ion secondary battery is a storage battery which has a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short circuit and ignition may be caused in batteries due to overcharging or overdischarging, and there is a demand for additional improvement in safety and reliability.

Under such circumstances, all-solid state secondary batteries in which an inorganic solid electrolyte is used instead of the organic electrolytic solution are attracting attention. In all-solid state secondary batteries, all of the negative electrode, the electrolyte, and the positive electrode are solid, safety and reliability which are considered as a problem of batteries in which the organic electrolytic solution is used can be significantly improved, and it also becomes possible to extend the service lives. Furthermore, all-solid state secondary batteries can be provided with a structure in which the electrodes and the electrolyte are directly disposed in series. Therefore, it becomes possible to increase the energy density to be higher than that of secondary batteries in which the organic electrolytic solution is used, and the application to electric vehicles, large-sized storage batteries, and the like is anticipated.

Due to the respective advantages described above, development of all-solid state secondary batteries as next-generation lithium ion batteries and compositions and sheets for producing all-solid state secondary batteries is underway (New Energy and Industrial Technology Development Organization (NEDO), Fuel Cell and Hydrogen Technologies Development Department, Electricity Storage Technology Development Section, "NEDO 2013 Roadmap for the Development of Next Generation Automotive Battery Technology" (August, 2013) and the like).

In the development of all-solid state secondary batteries, for example, a problem of the formation of a high-resistance layer in the interface between a positive electrode active material and a sulfide-based inorganic solid electrolyte during the operation of an all-solid state secondary battery and a consequent increase in the battery resistance is known. Regarding this problem, the use of a positive electrode active material coated with an ion-conductive material is proposed, and positive electrode active material layers are being formed by powder compacting. For example, in the invention described in JP2016-081905A, a dehydrated heptane dispersion liquid of $LiCoO_2$ (positive electrode active material) coated with $LiNbO_3$ and a sulfide solid electrolyte material is dried to prepare a positive electrode mixture from which heptane is removed, and the positive electrode mixture is pressurized, thereby shaping a positive electrode active material layer. In addition, in the invention described in JP2016-012495A, $LiCoO_2$ (positive electrode active material) coated with $LiNbO_3$ and sulfide solid electrolyte particles are dispersed in a butyl butyrate solution of polyvinylene difluoride (PVdF), and the obtained slurry for a positive electrode is applied and dried, thereby producing a positive electrode.

SUMMARY OF THE INVENTION

However, in order to satisfy more favorable battery performance that has been demanded in recent years, it cannot be said that the inventions described in JP2016-081905A and JP2016-012495A are sufficient, and, particularly, there is a demand for additional improvement of the initial voltage and the cycle characteristics.

The present inventors repeated intensive studies in consideration of the above-described circumstances and consequently clarified that the dispersion stability of a solid electrolyte composition that is used to produce an all-solid state secondary battery is an important element to satisfy the above-described requirements and the formation of an electrode active material layer using a solid electrolyte composition in which the dispersibility of an active material coated with an ion-conductive oxide and a sulfide-based inorganic solid electrolyte is improved while suppressing a decrease in the ion conductivity of the sulfide-based inorganic solid electrolyte enables the obtainment of an all-solid state secondary battery exhibiting a high initial voltage and favorable cycle characteristics.

That is, an object of the present invention is to provide a solid electrolyte composition having an excellent dispersion stability and capable of increasing the initial voltage and the cycle characteristics of an all-solid state secondary battery. In addition, another object of the present invention is to provide a solid electrolyte-containing sheet having an excellent ion conductivity and an excellent binding property and capable of increasing the initial voltage and the cycle characteristics of an all-solid state secondary battery. Furthermore, still another object of the present invention is to provide an all-solid state secondary battery having a high initial voltage and favorable cycle characteristics.

In addition, far still another object of the present invention is to provide methods for manufacturing a solid electrolyte-containing sheet and an all-solid state secondary battery having the above-described excellent performance respectively.

The above-described objects were achieved by the following means.

<1> A solid electrolyte composition comprising: (A) a sulfide-based inorganic solid electrolyte having a conductivity of an ion of a metal belonging to Group I or II of the periodic table; (B) an active material having a surface coated with an oxide having an ion conductivity; and (C) a dispersion medium, in which the dispersion medium (C) includes a polar dispersion medium (C1) satisfying the following conditions 1 and 2.

<Condition 1>

The polar dispersion medium has at least one polar group selected from the following group of polar groups.

<Group of Polar Groups>

A hydroxy group, a sulfanyl group, an ether group, a sulfide group, an amino group, an amide group, an ester group, a carbonyl group, a carbonate group, a carboxy group, and a cyano group <Condition 2>

At least one of substituents that are bonded to the polar group is a hydrocarbon group having a branched structure.

<2> The solid electrolyte composition according to <1>, in which the polar dispersion medium (C1) is an alicyclic compound.

<3> The solid electrolyte composition according to <1>, in which the polar dispersion medium (C1) is represented by Formula (1).

$$R^1-X-R^2 \quad (1)$$

In the formula, X represents —O—, —S—, —NR$^3$—, —C(=O)—, —C(=O)O—, or —C(=O)NR$^4$—. $R^1$ and $R^2$ each independently represent a hydrogen atom or a hydrocarbon group. Here, at least one of $R^1$ or $R^2$ is a hydrocarbon group having a branched structure. $R^1$ and $R^2$ may be bonded to each other to form a ring. $R^3$ and $R^4$ each independently represent a hydrogen atom, an alkyl group, or an aryl group.

<4> The solid electrolyte composition according to <3>, in which the polar dispersion medium (C1) is represented by Formula (2).

(2)

In the formula, Y represents —O—, —S—, —NR$^{13}$—, —C(=O)—, —C(=O)O—, or —C(=O)NR$^{14}$—. $R^{11}$ represents a hydrogen atom or an alkyl group. $R^{12}$ represents an alkyl group, and $R^{21}$ represents a hydrogen atom or an alkyl group. n is an integer of 0 to 5, and m is an integer of 0 to 2n+4. In a case in which there is a plurality of $R^{12}$'s, the plurality of $R^{12}$'s may be identical to or different from each other. $R^{13}$ and $R^{14}$ each independently represent a hydrogen atom, an alkyl group, or an aryl group.

<5> The solid electrolyte composition according to any one of <1> to <4>, in which a boiling point at 1,013 hPa of the polar dispersion medium (C1) is 100° C. or higher and 180° C. or lower.

<6> The solid electrolyte composition according to any one of <1> to <5>, further comprising: a binder (D).

<7> The solid electrolyte composition according to any one of <1> to <6>, further comprising: a conductive auxiliary agent (E).

<8> The solid electrolyte composition according to <6>, in which the binder (D) is at least one of an acrylic resin, a polyurethane resin, a polyurea resin, a polyimide resin, a polyamide resin, a polyether resin, a polycarbonate resin, a fluorine-containing resin, or a hydrocarbon-based thermoplastic resin.

<9> The solid electrolyte composition according to <6> or <8>, in which the binder (D) has a polar group (a).

<10> The solid electrolyte composition according to any one of <6>, <8>, and <9>, in which the binder (D) is particles having an average particle diameter of 10 to 1,000 nm.

<11> A solid electrolyte-containing sheet comprising: a layer containing (A) a sulfide-based inorganic solid electrolyte having a conductivity of an ion of a metal belonging to Group I or II of the periodic table, (B) an active material having a surface coated with an oxide having an ion conductivity, and a polar dispersion medium (C1) satisfying the following conditions 1 and 2, in which a content of the polar dispersion medium (C1) in the layer is 1 ppm or more and 10,000 ppm or less.

<Condition 1>

The polar dispersion medium has at least one polar group selected from the following group of polar groups.

<Group of Polar Groups>

A hydroxy group, a sulfanyl group, an ether group, a sulfide group, an amino group, an amide group, an ester group, a carbonyl group, a carbonate group, a carboxy group, and a cyano group <Condition 2>

At least one of substituents that are bonded to the polar group is a hydrocarbon group having a branched structure.

<12> A method for manufacturing a solid electrolyte-containing sheet, the method comprising: a step of applying the solid electrolyte composition according to any one of <1> to <10> onto a base material to form a coated film.

<13> An all-solid state secondary battery comprising: a positive electrode active material layer; a negative electrode active material layer; and a solid electrolyte layer, in which at least one layer of the positive electrode active material layer or the negative electrode active material layer is the solid electrolyte-containing sheet according to <11>.

<14> A method for manufacturing an all-solid state secondary battery, the method comprising: manufacturing an all-solid state secondary battery through the manufacturing method according to <12>.

In the present specification, numerical ranges expressed using "to" include numerical values before and after the "to" as the lower limit value and the upper limit value.

In the present specification, "acrylic" or "(meth)acrylic" that is simply expressed is used to refer to methacrylic and/or acrylic. In addition, "acryloyl" or "(meth)acryloyl" that is simply expressed is used to refer to methacryloyl and/or acryloyl.

In the present specification, "normal pressure" is 1,013 hPa (760 mmHg), and "normal temperature" is 25° C.

In the present specification, a mass-average molecular weight can be measured as a polystyrene-equivalent molecular weight by means of GPC unless particularly otherwise described. At this time, a GPC apparatus HLC-8220 (manufactured by Tosoh Corporation) is used, G3000HXL+ G2000HXL is used as a column, a flow rate at 23° C. is 1 mL/min, and the molecular weight is detected by RI. An eluent can be selected from tetrahydrofuran (THF), chloroform, N-methyl-2-pyrrolidone (NMP), and m-cresol/chloroform (manufactured by Shonanwako Junyaku KK), and THF is used in a case in which a subject needs to be dissolved.

The above-described and other characteristics and advantages of the present invention will be further clarified by the following description with appropriate reference to the accompanying drawings.

The solid electrolyte composition of the embodiment of the invention has an excellent dispersion stability and is capable of increasing the initial voltage and the cycle characteristics of an all-solid state secondary battery by forming an electrode active material layer using the solid electrolyte composition. The solid electrolyte-containing sheet of the embodiment of the invention has an excellent ion conductivity and an excellent binding property and is capable of increasing the initial voltage and the cycle characteristics of an all-solid state secondary battery by using the solid electrolyte-containing sheet as an electrode active material layer. The all-solid state secondary battery of the embodiment of the invention is capable of exhibiting a high initial voltage and favorable cycle characteristics.

In addition, according to the manufacturing methods of the embodiment of the invention, it is possible to preferably manufacture a solid electrolyte-containing sheet and an all-solid state secondary battery respectively which have the above-described excellent performance

DESCRIPTION OF THE PREFERRED EMBODIMENTS

Preferred Embodiment

Figure 1:
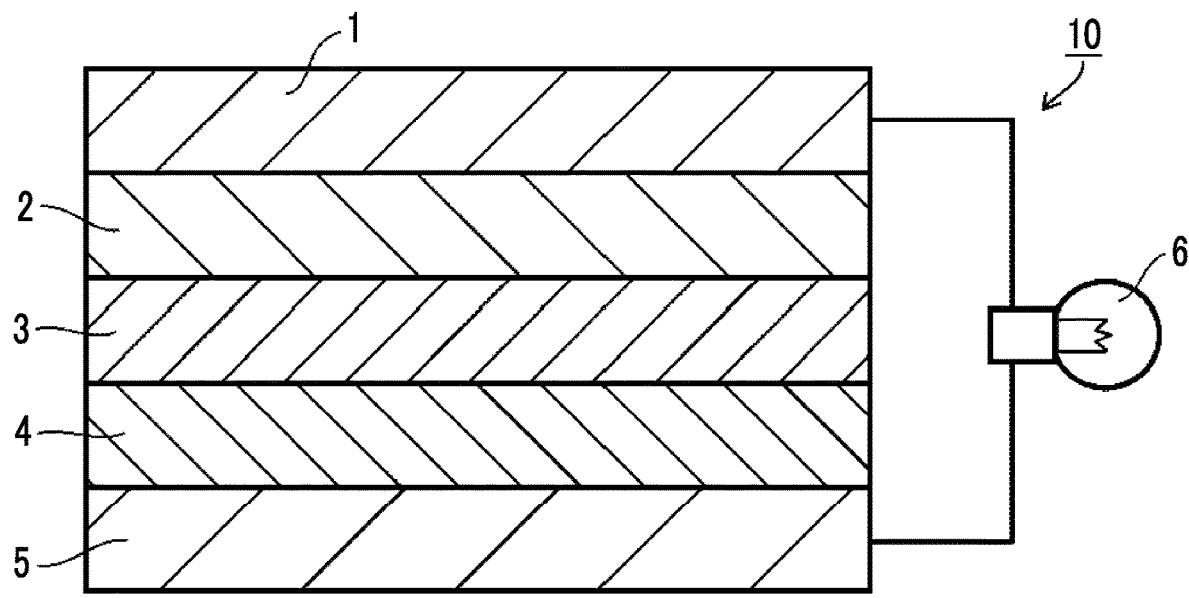
FIG. 1 is a vertical cross-sectional view schematically illustrating an all-solid state secondary battery according to a preferred embodiment of the present invention.

FIG. 1 is a cross-sectional view schematically illustrating an all-solid state secondary battery (lithium ion secondary battery) according to a preferred embodiment of the present invention. In the case of being seen from the negative electrode side, an all-solid state secondary battery 10 of the present embodiment has a negative electrode collector 1, a negative electrode active material layer 2, a solid electrolyte layer 3, a positive electrode active material layer 4, and a positive electrode collector 5 in this order. The respective layers are in contact with one another and have a laminated structure. In a case in which the above-described structure is employed, during charging, electrons (e$^-$) are supplied to the negative electrode side, and lithium ions (Li$^+$) are accumulated on the negative electrode side. On the other hand, during discharging, the lithium ions (Li$^+$) accumulated on the negative electrode side return to the positive electrode, and electrons are supplied to an operation portion 6. In an example illustrated in the drawing, an electric bulb is employed as the operation portion 6 and is lit by discharging. A solid electrolyte composition of the embodiment of the invention can be preferably used as a material used to form the negative electrode active material layer and/or the positive electrode active material layer. In addition, a solid electrolyte-containing sheet of the embodiment of the invention is preferred as the negative electrode active material layer and/or the positive electrode active material layer.

In the present specification, the positive electrode active material layer (hereinafter, also referred to as the positive electrode layer) and the negative electrode active material layer (hereinafter, also referred to as the negative electrode layer) will be collectively referred to as the electrode layer or the active material layer in some cases.

The thicknesses of the positive electrode active material layer 4, the solid electrolyte layer 3, and the negative electrode active material layer 2 are not particularly limited. Meanwhile, in a case in which the dimensions of ordinary batteries are taken into account, the thicknesses are preferably 10 to 1,000 μm and more preferably 20 μm or more and less than 500 μm. In the all-solid state secondary battery of the embodiment of the invention, the thickness of at least one layer of the positive electrode active material layer 4, the solid electrolyte layer 3, or the negative electrode active material layer 2 is still more preferably 50 μm or more and less than 500 μm.

<Solid Electrolyte Composition>

The solid electrolyte composition of the embodiment of the invention is a solid electrolyte composition containing (A) a sulfide-based inorganic solid electrolyte having the conductivity of an ion of a metal belonging to Group I or II of the periodic table, (B) an active material having a surface coated with an oxide having an ion conductivity, and (C) a dispersion medium, in which the dispersion medium (C) includes a polar dispersion medium (C1) satisfying the following conditions 1 and 2.

Hereinafter, the respective components in the composition will be described in detail.

(Sulfide-Based Inorganic Solid Electrolyte (A))

The solid electrolyte composition of the embodiment of the invention contains a sulfide-based inorganic solid electrolyte (A).

The inorganic solid electrolyte is an inorganic solid electrolyte, and the solid electrolyte refers to a solid-form electrolyte capable of migrating ions therein. The inorganic solid electrolyte is clearly differentiated from organic solid electrolytes (high-molecular-weight electrolytes represented by polyethylene oxide (PEO) or the like and organic electrolyte salts represented by lithium bis(trifluoromethanesulfonyl)imide (LiTFSI)) since the inorganic solid electrolyte does not include any organic substances as a principal ion-conductive material. In addition, the inorganic solid electrolyte is a solid in a static state and is thus, generally, not disassociated or liberated into cations and anions. Due to this fact, the inorganic solid electrolyte is also clearly differentiated from inorganic electrolyte salts of which cations and anions are disassociated or liberated in electrolytic solutions or polymers (LiPF$_6$, LiBF$_4$, LiFSI, LiCl, and the like). The inorganic solid electrolyte is not particularly limited as long as the inorganic solid electrolyte has conductivity of ions of metals belonging to Group I or II of the periodic table and is generally a substance not having electron conductivity.

As the inorganic solid electrolyte, it is possible to appropriately select and use solid electrolyte materials that are applied to this kind of products. Typical examples of the inorganic solid electrolyte include (i) sulfide-based inorganic solid electrolytes and (ii) oxide-based inorganic solid electrolytes. In the present invention, the sulfide-based inorganic solid electrolytes are preferably used.

Sulfide-based inorganic solid electrolytes that are used in the present invention are preferably inorganic solid electrolytes which contain sulfur atoms (S), have ion conductivity of metals belonging to Group I or II of the periodic table, and have electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases.

Examples thereof include lithium ion-conductive sulfide-based inorganic solid electrolytes satisfying a composition represented by Formula (I).

$$L_{a1}M_{b1}P_{c1}S_{d1}A_{e1} \qquad \text{Formula (I)}$$

In the formula, L represents an element selected from Li, Na, and K and is preferably Li. M represents an element selected from B, Zn, Sn, Si, Cu, Ga, Sb, Al, and Ge. A represents an element selected from I, Br, Cl, and F. a1 to e1 represent the compositional ratios among the respective elements, and a1:b1:c1:d1:e1 satisfies 1 to 12:0 to 5:1:2 to 12:0 to 10. Furthermore, a1 is preferably 1 to 9 and more preferably 1.5 to 7.5. b1 is preferably 0 to 3. Furthermore, d1 is preferably 2.5 to 10 and more preferably 3.0 to 8.5. Furthermore, e1 is preferably 0 to 5 and more preferably 0 to 3.

The compositional ratios among the respective elements can be controlled by adjusting the amounts of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case in which the ratio between $Li_2S$ and $P_2S_5$ is set in the above-described range, it is possible to increase the lithium ion conductivity. Specifically, the lithium ion conductivity can be preferably set to $1 \times 10^{-4}$ S/cm or more and more preferably set to $1 \times 10^{-3}$ S/cm or more. The upper limit is not particularly limited, but realistically $1 \times 10^{-1}$ S/cm or less.

As specific examples of the sulfide-based inorganic solid electrolytes, combination examples of raw materials will be described below. Examples thereof include $Li_2S$—$P_2S_5$, $Li_7S$—$P_2S_5$—LiCl, $Li_2S$—$P_2S_5$—$H_2S$, $Li_2S$—$H_2S_5$—$H_7S$—LiCl, $Li_2S$—LiI—$P_7S_5$, $Li_2S$—LiBr—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_7S$—$P_7S_5$—SnS, $Li_7S$—$P_2S_5$—$Al_2S_3$, $Li_2S$—$GeS_2$, $Li_2S$—$GeS_7$—ZnS, $Li_2S$—$Ga_2S_3$, $Li_2S$—$GeS_2$—$Ga_2S_3$, $Li_2S$—$GeS_2$—$P_2S_5$, $Li_1S$—$GeS_2$—$Sb_2S_5$, $Li_2S$—$GeS_2$—$Al_2S_3$, $Li_2S$—$SiS_2$, $Li_2S$—$Al_2S_3$, $Li_7S$—$SiS_2$—$Al_2S_3$, $Li_2S$—$SiS_7$—$H_2S_5$, $Li_7S$—$SiS_2$—$Li_4SiO_4$, $Li_2S$—$SiS_2$—$Li_3PO_4$, $Li_{10}GeP_2S_p$, and the like. Mixing ratios of the respective raw materials do not matter. Examples of a method for synthesizing sulfide-based inorganic solid electrolyte materials using the above-described raw material compositions include an amorphorization method. Examples of the amorphorization method include a mechanical milling method, a solution method, and a melting quenching method. This is because treatments at a normal temperature (25° C.) become possible, and it is possible to simplify manufacturing steps.

The volume-average particle diameter of the sulfide-based inorganic solid electrolyte is not particularly limited, but is preferably 0.01 µm or more and more preferably 0.1 µm or more. The upper limit is preferably 100 µm or less and more preferably 50 µm or less. Meanwhile, the average particle diameter of the sulfide-based inorganic solid electrolyte particles is measured in the following order. One percent by mass of a dispersion liquid is obtained by dilution using the sulfide-based inorganic solid electrolyte particles and water (heptane in a case in which the sulfide-based inorganic solid electrolyte is unstable in water) in a 20 ml sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (manufactured by Horiba Ltd.), and a silica cell for measurement at a temperature of 25° C., thereby obtaining the volume-average particle diameter. Regarding other detailed conditions and the like, the description of HS Z8828:2013 "Particle size analysis-Dynamic light scattering method" is referred to as necessary. Five specimens are produced and measured per level, and the average values thereof are employed.

In a case in which a decrease in the interface resistance and the maintenance of the decreased interface resistance in the case of being used in the all-solid state secondary battery are taken into account, the content of the sulfide-based inorganic solid electrolyte in the solid component of the solid electrolyte composition is preferably 5% by mass or more, more preferably 10% by mass or more, and particularly preferably 15% by mass or more with respect to 100% by mass of the solid components. From the same viewpoint, the upper limit is preferably 99.9% by mass or less, more preferably 99.5% by mass or less, and particularly preferably 99% by mass or less.

These sulfide-based inorganic solid electrolytes may be used singly or two or more sulfide-based inorganic solid electrolytes may be used in combination.

Meanwhile, the solid content (solid component) in the present specification refers to a component that does not volatilize or evaporate and thus disappear in the case of being subjected to a drying treatment in a nitrogen atmosphere at 80° C. for six hours. Typically, the solid content refers to a component other than a dispersion medium described below.

(Oxide-Based Inorganic Solid Electrolytes)

The solid electrolyte composition of the embodiment of the invention may also contain, in addition to the sulfide-based inorganic solid electrolyte (A), an oxide-based inorganic solid electrolyte as long as the effect of the present invention is exhibited. The oxide-based inorganic solid electrolyte is preferably a compound which contains an oxygen atom (O), has an ion conductivity of a metal belonging to Group I or II of the periodic table, and has electron-insulating properties.

Specific examples of the compounds include $Li_{xa}La_{ya}TiO_3$ [xa=0.3 to 0.7 and ya=0.3 to 0.7] (LLT), $Li_{xb}La_{yb}Zr_{zb}M^{bb}{}_{mb}O_{nb}$ ($M^{bb}$ is at least one element of Al, Mg, Ca, Sr, V, Nb, Ta, Ti, Ge, In or Sn, xb satisfies 5≤x≤10, yb satisfies 1≤yb≤4, zb satisfies 1≤zb≤4, mb satisfies 0≤mb≤2, and nb satisfies 5≤nb≤20.), $Li_{xc}B_{yc}M^{cc}{}_{zc}O_{nc}$ ($M^{cc}$ is at least one element of C, S, Al, Si, Ga, Ge, In, or Sn, xc satisfies 0≤xc≤5, yc satisfies 0≤yc≤1, zc satisfies 0≤zc≤1, and nc satisfies $0 \leq nc \leq 6$), $Li_{xd}(Al, Ga)_{yd}(Ti, Ge)_{zd}Si_{ad}P_{md}O_{nd}$ ($1 \leq xd \leq 3$, $0 \leq yd \leq 1$, $0 \leq zd \leq 2$, $0 \leq ad \leq 1$, $1 \leq md \leq 7$, $3 \leq nd \leq 13$), $Li_{(3-2xc)}M^{cc}{}_{xc}D^{cc}O$ (xe represents a number of 0 or more and 0.1 or less, and $M^{ee}$ represents a divalent metal atom. $D^{ee}$ represents a halogen atom or a combination of two or more halogen atoms.), $Li_{xf}Si_{yf}O_{zf}$ ($1 \leq xf \leq 5$, $0 \leq yf \leq 3$, $1 \leq zf \leq 10$), $Li_{xg}S_{yg}O_{zg}$ ($1 \leq xg \leq 3$, $0 < yg \leq 2$, $1 \leq zg \leq 10$), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovskite-type crystal structure, $LiTi_2P_3O_{12}$ having a natrium super ionic conductor (NASICON)-type crystal structure, $Li_{1+xh+yh}(Al, Ga)_{xh}(Ti, Ge)_{2-xh}Si_{yh}P_{3-yh}O_{12}$ ($0 \leq xh \leq 1$, $0 \leq yh \leq 1$), $Li_7La_3Zr_2O_{12}$ (LLZ) having a garnet-type crystal structure. In addition, phosphorus compounds containing Li, P and O are also desirable. Examples thereof include lithium phosphate ($Li_3PO_4$), LiPON in which some of oxygen atoms in lithium phosphate are substituted with nitrogen, $LiPOD^1$ ($D^1$ is at least one element selected from Ti, V, Cr, Mn, Fe, Co, Ni, Cu, Zr, Nb, Mo, Ru, Ag, Ta, W, Pt, Au, or the like), and the like. It is also possible to preferably use $LiA^1ON$ ($A^1$ represents at least one element selected from Si, B, Ge, Al, C, Ga, or the like) and the like.

As the volume-average particle diameter of the oxide solid electrolyte and the measurement method thereof, the description of the volume-average particle diameter of the sulfide-based inorganic solid electrolyte (A) and the measurement method thereof can be preferably applied.

<Active Material (B) Having Surface Coated with Oxide Having Ion Conductivity>

From the viewpoint of effectively suppressing an increase in the battery resistance by suppressing the formation of a high-resistance layer in the interface between a positive electrode active material or a negative electrode active material and the sulfide-based inorganic solid electrolyte, the solid electrolyte composition of the embodiment of the invention contains an active material (B) having a surface coated with an oxide having an ion conductivity (hereinafter, also referred to as the ion-conductive oxide) (hereinafter, also referred to as the coated active material (B)).

In the present specification, "a surface coated with an oxide having an ion conductivity" means that at least a part of the surface of the active material is coated with an oxide having an ion conductivity, and all or a part of the surface of the active material may be uniformly or unevenly coated as long as the effect of the present invention is exhibited.

(1) Ion-Conductive Oxide

The ion-conductive oxide that coats the active material is preferably a lithium ion-conductive oxide, examples thereof include oxides represented by General Formula $Li_xAO_y$ (A is B, C, Al, Si, P, S, Ti, Zr, Nb, Mo, Ta, Sc, V, Y, Ca, Sr, Ba, Hf, Ta, Cr, or W, and x and y are a positive number). Specific examples thereof include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$ (LTO), $Li_2Ti_2O_5$, $Li_2ZrO_3$ (LZO), $LiNbO_3$ (LNbO), $Li_2MoO_4$, $Li_2WO_4$, and the like, and $Li_4Ti_5O_{12}$, $Li_2ZrO_3$, or $LiNbO_3$ are preferred.

In addition, the lithium ion-conductive oxide may be a complex oxide. As the complex oxide that coats the active material, it is possible to employ a random combination of the lithium ion-conductive oxide, and examples thereof include $Li_4SiO_4$—$Li_3BO_3$, $Li_4SiO_4$—$Li_3PO_4$, and the like.

The thickness of the ion-conductive oxide that coats the active material is, for example, preferably 0.1 nm or more and 100 nm or less and more preferably 1 nm or more and 20 nm or less. The thickness of the ion-conductive oxide can be measured using, for example, a transmission electron microscope (TEM) or the like.

The particle surfaces of ion-conductive oxide are preferably coated at a uniform film thickness, but may be coated at uneven film thicknesses as long as the action effect of the present invention is obtained.

As an ordinary method for producing the coated active material (B), a method in which a precursor of the ion-conductive oxide is prepared using a sol-gel method (hereinafter, also referred to as the sol-gel solution) and this precursor is applied to the active material is exemplified. As an applicable method, a method in which the active material is immersed in the sol-gel solution, a method in which the sol-gel solution is sprayed to the active material, and the like are exemplified.

The active material produced using the sol-gel method is preferably fired. The firing temperature is preferably 200° C. or higher, more preferably 250° C. or higher, and still more preferably 300° C. or higher.

(2) Active Material Having Surface Coated with Ion-Conductive Oxide

As the active material having a surface coated with the ion-conductive oxide, active materials that are normally used in all-solid state secondary batteries are exemplified without any particular limitation.

The active material refers to a substance capable of intercalating and deintercalating an ion of a metal element belonging to Group I or II of the periodic table. As the active material, a positive electrode active material and a negative electrode active material are exemplified, and a transition metal oxide that is a positive electrode active material or a metal oxide that is a negative electrode active material is preferred.

—Positive Electrode Active Material—

A positive electrode active material that is used in the present invention is preferably a positive electrode active material capable of reversibly intercalating and deintercalating lithium ions. The above-described material is not particularly limited as long as the material has the above-described characteristics and may be transition metal oxides, organic substances, elements capable of being complexed with Li such as sulfur, complexes of sulfur and metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferred. In addition, an element $M^b$ (an element of Group I (Ia) of the metal periodic table other than lithium, an element of Group II (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. The positive electrode active material is more preferably synthesized by mixing the element into the transition metal oxide so that the molar ratio of Li/$M^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNiO_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

In the present invention, the transition metal oxides having a bedded salt-type structure (MA) is preferred, and LCO, NCA, or NMC is more preferred.

The shape of the positive electrode active material is not particularly limited, but is preferably a particle shape. The volume-average particle diameter (circle-equivalent average particle diameter) of positive electrode active material is not particularly limited. For example, the volume-average particle diameter can be set to 0.1 to 50 µm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The volume-average particle diameter (circle-equivalent average particle diameter) of positive electrode active material particles can be measured using a laser diffraction/scattering-type particle size distribution measurement instrument LA-920 (trade name, manufactured by Horiba Ltd.).

—Negative Electrode Active Material—

A negative electrode active material that is used in the present invention may contain is preferably a negative electrode active material capable of reversibly intercalating and deintercalating lithium ions. The above-described material is not particularly limited as long as the material has the above-described characteristics, and examples thereof include carbonaceous materials, metal oxides such as tin oxide, silicon oxide, metal complex oxides, a lithium single body, lithium alloys such as lithium aluminum alloys, metals capable of forming alloys with lithium such as Sn, Si, Al, and In and the like. Among these, carbonaceous materials or metal complex oxides are preferably used in terms of reliability. In addition, the metal complex oxides are preferably capable of absorbing and deintercalating lithium. The materials are not particularly limited, but preferably contain titanium and/or lithium as constituent components from the viewpoint of high-current density charging and discharging characteristics.

The carbonaceous material that is used as the negative electrode active material is a material substantially consisting of carbon. Examples thereof include petroleum pitch, carbon black such as acetylene black (AB), graphite (natural graphite, artificial graphite such as highly oriented pyrolytic graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, flat graphite, and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which CuKα rays are used and may have crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be complex oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the absorption and deintercalation of lithium ions is small, and thus the high-speed charging and discharging characteristics are excellent, and the deterioration of electrodes is suppressed, whereby it becomes possible to improve the service lives of lithium ion secondary batteries.

In the present invention, a Si-based negative electrode is also preferably applied. Generally, a Si negative electrode is capable of absorbing a larger number of Li ions than a carbon negative electrode (graphite, acetylene black, or the like). That is, the amount of Li ions absorbed per unit mass increases. Therefore, it is possible to increase the battery capacity. As a result, there is an advantage that the battery driving duration can be extended.

The shape of the negative electrode active material is not particularly limited, but is preferably a particle shape. The average particle diameter of the negative electrode active material is preferably 0.1 µm to 60 µm. In order to provide a predetermined particle diameter, an ordinary crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out. The average particle diameter of negative electrode active material particles can be measured using the same method as the method for measuring the volume-average particle diameter of the positive electrode active material.

The chemical formulae of the compounds obtained using a firing method can be computed using an inductively coupled plasma (ICP) emission spectroscopic analysis method as a measurement method from the mass difference of powder before and after firing as a convenient method.

(3) Coated Active Material (B)

The coated active material (B) that is used in the present invention may be used singly or two or more coated active materials may be used in combination.

Hereinafter, there will be cases in which a positive electrode active material having a surface coated with an oxide having an ion conductivity is referred to as a "coated positive electrode active material" and a negative electrode active material having a surface coated with an oxide having an ion conductivity is referred to as a "coated negative electrode active material" respectively.

In the present invention, a solid electrolyte composition containing the coated positive electrode active material is used as a composition for a positive electrode, and a solid electrolyte composition containing the coated negative electrode active material is used as a composition for a negative electrode.

Meanwhile, the surfaces of the coated positive electrode active material and/or the coated negative electrode active material may be surface-treated with an active light ray or an active gas (plasma or the like) before or after the coating of the surface with the ion-conductive oxide.

In addition, the surfaces of electrodes including the coated positive electrode active material and/or the coated negative electrode active material may be surface-treated with sulfur or phosphorus.

An oxide layer having an ion conductivity which forms the surface of the coated active material may include a conductive substance, for example, carbon black such as acetylene black (AB) or graphite (natural graphite, artificial graphite such as highly oriented pyrolytic graphite, or the like) on the inside of the oxide layer or the outside of the oxide layer.

In the case of forming the positive electrode active material layer, the mass (mg) (weight per unit area) of the coated positive electrode active material per unit area ($cm^2$) of the positive electrode active material layer is not particularly limited. The mass can be appropriately determined depending on the designed battery capacity. In the case of forming the negative electrode active material layer, the description of the weight per unit area in the case of forming the positive electrode active material layer is applied to the weight per unit area of the coated negative electrode active material.

The content of the coated positive electrode active material in the solid electrolyte composition is not particularly limited, but is preferably 10% to 95% by mass, more preferably 30% to 90% by mass, still more preferably 50% to 85% by mass, and particularly preferably 55% by mass to 80% by mass with respect to 100% by mass of the solid content. In addition, the content of the coated negative electrode active material in the solid electrolyte composition is not particularly limited, but is preferably 10% to 80% by mass and more preferably 20% to 80% by mass with respect to 100% by mass of the solid content.

The shape of the coated positive electrode active material is not particularly limited, but is preferably a particle shape. The volume-average particle diameter (circle-equivalent average particle diameter) of the coated positive electrode active material is not particularly limited, but can be set to, for example, 0.1 to 50 μm. The shape of the coated negative electrode active material is not particularly limited, but is preferably a particle shape. The average particle diameter of the coated negative electrode active material is not particularly limited, but can be set to, for example, 0.1 to 60 μm. The average particle diameters of the coated positive electrode active material and the coated negative electrode active material can be measured using the same method as the method for measuring the volume-average particle diameter of the positive electrode active material.

The solid electrolyte composition of the embodiment of the invention is also capable of containing an active material which is not coated with the ion-conductive oxide and is described in the section of (2) the active material coated with the ion-conductive oxide in addition to the coated active material (B).

(Dispersion Medium (C))

The solid electrolyte composition of the embodiment of the invention contains a dispersion medium (C) in order to disperse the solid components. The dispersion medium (C) that is used in the present invention includes a polar dispersion medium (C1) satisfying the following conditions 1 and 2.

<Condition 1>

The polar dispersion medium has at least one polar group selected from the following group of polar groups.

<Group of Polar Groups>

A hydroxy group (—OH), a sulfanyl group (—SH), an ether group (—O—), a sulfide group (—S—), an amino group (—N($R^{03}$)$_2$), an amide group (—C(=O)N$R^{04}$—), an ester group (—C(=O)O—), a carbonyl group (—C(=O)—), a carbonate group (—OC(=O)O—), a carboxy group (—C(=O)OH), and a cyano group (—CN).

<Condition 2>

At least one of substituents that are bonded to the polar group is a hydrocarbon group having a branched structure.

In the present specification, "substituents that are bonded to the polar group" refer to substituents that are bonded to bonding sites in the polar group. The number of the bonding sites present in the polar group is one in the case of a monovalent polar group and two in the case of a divalent polar group. In the group of polar groups, a hydroxy group, a sulfanyl group, an amino group, a carboxy group, and a cyano group are monovalent polar groups, and an ether group, a sulfide group, an amide group, an ester group, a carbonyl group, and a carbonate group are divalent polar groups.

Specifically, for example, in isopropanol having a monovalent polar group, the polar group is a hydroxy group, and the substituent that is bonded to the polar group is an isopropyl group, and, in cyclopentyl ethyl ether having a divalent polar group, the polar group is an ether group, and the substituent that is bonded to the polar group is a cyclopentyl group and an ethyl group.

Here, $R^{03}$ and $R^{04}$ each independently represent a hydrogen atom, an alkyl group (preferably having 1 to 6 carbon atoms and more preferably 1 or 2 carbon atoms; examples thereof include a methyl group and an ethyl group), or an aryl group (preferably having 6 to 14 carbon atoms and more preferably 6 to 10 carbon atoms; examples thereof include a phenyl group and a tolyl group).

In the present specification, "branched structure" refers to a structure having a tertiary carbon atom or a quaternary carbon atom and a structure having a secondary carbon atom that is bonded to a polar group selected from the above-described group of polar groups. Meanwhile, in an aromatic hydrocarbon group, on the basis of the number of carbon atoms that are actually bonded to the polar group, in a case in which three carbon atoms are bonded to the polar group, the carbon atoms are considered as a tertiary carbon atom, and, in a case in which two carbon atoms are bonded to the polar group, the carbon atoms are considered as a secondary carbon atom. That is, in a case in which phenol is considered as an example, carbon atoms in a phenyl group which are bonded to a hydroxy group that is a polar group are a secondary carbon atom.

In a case in which the solid electrolyte composition of the embodiment of the invention contains the dispersion medium (C) including the polar dispersion medium (C1), the sedimentation of the components such as the sulfide-based inorganic solid electrolyte (A) and the coated active material (B) can be suppressed, and thus the solid electrolyte composition has an excellent dispersion stability.

That is, in the solid electrolyte composition of the embodiment of the invention, the dispersion medium (C) includes the polar dispersion medium (C1) and thus exhibits an effect of dispersing the components such as the sulfide-based inorganic solid electrolyte (A) and the coated active material (B).

In addition, the dispersion medium (C) including the polar dispersion medium (C1) has a poor reactivity with the sulfide-based inorganic solid electrolyte (A) and is thus assumed to suppress the decomposition of the sulfide-based inorganic solid electrolyte (A). Therefore, it is considered that the solid electrolyte composition of the embodiment of the invention is capable of maintaining the ion conductivity of the sulfide-based inorganic solid electrolyte (A) while preventing a significant decrease of the ion conductivity by decomposition.

(1) Polar Dispersion Medium (C1)

Hereinafter, in a case in which there is no expression of normal, iso-, neo-, tert-, cyclo-, or the like in the description of the polar dispersion medium (C1), the polar dispersion medium refers to a polar dispersion medium having any of a linear structure, a branched structure, and a ring structure. In addition, in a case in which there is no expression of o-, m-, p-, 1-, 2-, or the like in the ring structure, the location of the substituent is considered to be not particularly limited.

The polar dispersion medium (C1) is not particularly limited as long as the polar dispersion medium satisfies the conditions 1 and 2. As the above-described polar dispersion medium (C1), a polar dispersion medium having a hydroxy group (an alcohol compound solvent), a polar dispersion medium having a sulfanyl group (a thiol compound solvent), a polar dispersion medium having an ether group (an ether compound solvent), a polar dispersion medium having a sulfide group (a sulfide compound solvent), a polar dispersion medium having an amino group (an amine compound solvent), a polar dispersion medium having an amide group (an amide compound solvent), a polar dispersion medium having an ester group (an ester compound solvent), a polar dispersion medium having a carbonyl group (a ketone compound solvent), a polar dispersion medium having a carbonate group (a carbonate compound solvent), a polar dispersion medium having a carboxy group (a carboxylic acid compound solvent), a polar dispersion medium having a cyano group (a nitrile compound solvent), or the like can be used. Hereinafter, the names in the parentheses will be used in some cases.

These polar dispersion media (C1) may be used singly or two or more polar dispersion media may be used in combination. In addition, in these polar dispersion media (C1), substituents that are bonded to the polar group may be bonded to each other to form a ring structure, and examples thereof include a cyclic ether compound solvent, a lactone compound solvent, a lactide compound solvent, and a lactam compound solvent.

The substituent that is bonded to the polar group (hereinafter, also referred to as the "adjacent substituent") is at least a hydrocarbon group, preferably an aliphatic hydrocarbon group or an aromatic hydrocarbon group, and preferably an alkyl group or an aryl group.

The alkyl group as the adjacent substituent preferably has 1 to 30 carbon atoms, more preferably has 1 to 18 carbon atoms, and still more preferably has 1 to 12 carbon atoms. Specific examples thereof include a methyl group, an ethyl group, a propyl group, a butyl group, a pentyl group, a hexyl group, and the like.

The aryl group as the adjacent substituent preferably has 6 to 20 carbon atoms, more preferably has 6 to 12 carbon atoms, and still more preferably has 6 to 10 carbon atoms. Specific examples thereof include a phenyl group, a tolyl group, and the like.

The hydrocarbon groups that are adjacent substituents may be bonded to each other to form a ring, and examples of the ring being formed by the bonding between the hydrocarbon groups include rings including the above-described divalent polar group (preferably an ether group). The number of ring members of the ring being formed by the bonding between the hydrocarbon groups is preferably 3 to 12, more preferably 3 to 8, and still more preferably 3 to 6, and, as a specific skeleton structure of the ring, a tetrahydropyran ring, a tetrahydrofuran ring, and the like are exemplified. Here, the ring being formed by the bonding between the hydrocarbon groups has a branched structure.

From the viewpoint of the capability of suppressing the reaction with the sulfide-based inorganic solid electrolyte (A), the adjacent substituent is preferably sterically bulky.

An A value, which represents an index of steric bulkiness, of the adjacent substituent is preferably 2 or more. The actual upper limit value of the A value is less than 5. Specific example of the adjacent substituent described with the A value include an ethyl group (A=1.75), a neopentyl group (A=2), an isopropyl group (A=2.15), a cyclohexyl group (A=2.15), a phenyl group (A=3), a tert-butyl group (A>4), and the like.

Here, the A value representing the steric bulkiness refers to the free energy difference between an axial (ax) bond and an equatorial (eq) bond on a cyclohexane ring, and it is possible to refer to the description of Eliel, E. L.; Wilen, S. H.; Doyle, M. P. Basic Organic Stereochemistry, Wiley, 2001, p. 443.

In the present invention, at least one substituent of the adjacent substituents is a hydrocarbon group having a branched structure.

As the hydrocarbon group having a branched structure, among hydrocarbon groups in the above-described adjacent substituents, hydrocarbon groups having a branched structure are exemplified, and an isopropyl group, an isobutyl group, a sec-butyl group, a tert-butyl group, an isopentyl group, a neopentyl group, a tert-pentyl group, an isoamyl group, a sec-isoamyl group, and a tert-amyl group are preferably exemplified. Among these, in a case in which an atom that is bonded to the polar group is considered as the first atom, a group having a branched structure in the first to third atoms from the polar group is preferred, a group having a branched structure in the first or second atom is more preferred, and a group having a branched structure in the first atom is still more preferred.

The hydrocarbon group having a branched structure is preferably an alicyclic hydrocarbon group from the viewpoint of the above-described bulkiness. In the alicyclic hydrocarbon group, the number of ring members is preferably 3 to 12, more preferably 3 to 8, and still more preferably 3 to 6. As specific alicyclic hydrocarbon groups, a cyclopropyl group, a cyclobutyl group, a cyclopentyl group, a cyclohexyl group, a cyclooctyl group, and the like are preferably exemplified. Among these, in a case in which an atom that is bonded to the polar group is considered as the first atom, a group having a branched structure in the first to third atoms from the polar group is preferred, a group having a branched structure in the first or second atom is more preferred, and a group having a branched structure in the first atom is still more preferred.

That is, the polar dispersion medium (C1) that is used in the present invention is preferably represented by Formula (1).

$$R^1-X-R^2 \tag{1}$$

In the formula, X represents —O—, —S—, —NR$^3$—, —C(=O)—, —C(=O)O—, or —C(=O)NR$^4$—. R$^1$ and R$^2$ each independently represent a hydrogen atom or a hydrocarbon group. Here, at least one of R$^1$ or R$^2$ is a hydrocarbon group having a branched structure. R$^1$ and R$^2$ may be bonded to each other to form a ring. R$^3$ and R$^4$ each independently represent a hydrogen atom, an alkyl group, or an aryl group.

The hydrocarbon group as R$^1$ and R$^2$ is the same as the hydrocarbon group among the adjacent substituents.

The hydrocarbon group having a branched structure as R$^1$ and R$^2$ is the same as the hydrocarbon group having a branched structure among the adjacent substituents.

The ring being formed by the bonding of R$^1$ and R$^2$ is the same as the ring being formed by the bonding of the hydrocarbon groups.

The alkyl group and the aryl group as R$^3$ and R$^4$ are the same as the alkyl group and the aryl group as R$^{03}$ and R$^{04}$.

X is preferably —O—, —S—, —C(=O)—, or —C(=O)O— and more preferably —O—, —C(=O)—, or —C(=O)O—.

The polar dispersion medium (C1) that is used in the present invention is represented by Formula (2).

In the formula, Y represents —O—, —S—, —NR$^{13}$—, —C(=O)—, —C(=O)O—, or —C(=O)NR$^{14}$—. R$^{11}$ represents a hydrogen atom or an alkyl group. R$^{12}$ represents an alkyl group, and R$^{21}$ represents a hydrogen atom or an alkyl group. n is an integer of 0 to 5, and m is an integer of 0 to 2n+4. In a case in which there is a plurality of R$^{12}$'s, the plurality of R$^{12}$'s may be identical to or different from each other. R$^{13}$ and R$^{14}$ each independently represent a hydrogen atom, an alkyl group, or an aryl group.

To the alkyl group as R$^{11}$, the alkyl group as R$^{12}$, and the alkyl group as R$^{21}$, it is possible to preferably apply the description of the alkyl group as the adjacent substituent.

The alkyl group and the aryl group as R$^{13}$ and R$^{14}$ are the same as the alkyl group and the aryl group as R$^{03}$ and R$^{04}$.

n is preferably an integer of 0 to 3 and more preferably an integer of 0 to 2.

m is preferably an integer of 0 to 6 and more preferably an integer of 0 to 2.

Y is preferably —O—, —S—, —C(=O)—, or —C(=O)O— and more preferably —O—, —C(=O)—, or —C(=O)O—.

In the polar dispersion medium (C1), at least one adjacent substituent has a branched structure. As the polar dispersion medium (C1) having a branched structure, specifically, the following solvents are exemplified.

Specific examples of an alcohol compound solvent include isopropanol, isobutanol, t-butanol, sec-butanol, isoamyl alcohol, t-amyl alcohol, sec-amyl alcohol, sec-butyl carbinol, 2-ethyl-1-butanol, 2-methyl-1-pentanol, 3-methyl-1-pentanol, 4-methyl-1-pentanol, 4-heptanol, 3-hexanol, 2-ethyl-1-hexanol, dimethylpropyl carbinol, 2-pentanol, 3,5,5-trimethyl-1-hexanol, tetrahydrogeraniol, ethylene glycol monoisopropyl ether, ethylene glycol mono-tert-butyl ether, and 1,3-butanediol.

Specific examples of a thiol compound solvent include 2-propanethiol, 2-methyl-1-propanethiol, 3-methyl-1-butanethiol, and 2-ethyl-1-hexanethiol.

Specific examples of an ether compound solvent include diisopropyl ether, diisobutyl ether, diisopentyl ether, t-butyl ethyl ether, ethyl isopropyl ether, tert-amyl ethyl ether, sec-butyl ethyl ether, sec-butyl ether, 2-methyl tetrahydrofuran, 4-methyl tetrahydropyran, propylene glycol monomethyl ether, and propylene glycol monomethyl ether acetate.

Specific examples of a sulfide compound solvent include methyl isopropyl sulfide, ethyl isopropyl sulfide, diisopropyl sulfide, and diisobutyl sulfide.

Specific examples of an amine compound solvent include triisobutylamine and diisobutylamine.

Specific examples of an amide compound solvent include N, N-dimethylisobutylamide.

Specific examples of an ester compound solvent include ethyl isobutyrate, propyl isobutyrate, isopropyl isobutyrate, isobutyl isobutyrate, ethyl pivalate, isobutyl propionate, t-butyl propionate, isoamyl propionate, ethyl t-butyl acetate, ethyl 3-ethoxypropionate, ethyl isovalerate, butyl isovalerate, isoamyl isobutyrate, ethyl DL-2-methylbutyrate, isobutyl butyrate, isoamyl butyrate, ethyl 2-ethylbutyrate, and hexyl propionate.

Specific examples of a ketone compound solvent include ethyl isopropyl ketone, diisobutyl ketone, diisopropyl ketone, isobutyl propyl ketone, isobutyl isopropyl ketone, ethyl isobutyl ketone, isopropyl propyl ketone, and sec-butyl propyl ketone.

Specific examples of a carbonate compound solvent include diisopropyl carbonate and diisobutyl carbonate.

Specific examples of a carboxylic acid compound solvent include isobutyric acid, pivalic acid, and isovaleric acid.

Specific examples of a nitrile compound solvent include isobutyronitrile and isocapronitrile.

The polar dispersion medium (C1) more preferably has an alicyclic structure, that is, an alicyclic compound. As the polar dispersion medium (C1) having an alicyclic structure, specifically, the following solvents are exemplified.

Specific examples of an alicyclic alcohol compound solvent include cyclopentanol (bp: 140° C.), cyclopentylmethanol (bp: 163° C.), cyclopentylethanol (bp: 182° C.), 1-methylcyclopentanol, 1-ethylcyclopentanol, cyclohexanol (bp: 161° C.), 1-methylcyclohexanol (bp: 155° C.), 1-ethylcyclohexanol (bp: 168° C.), 2-methylcyclohexanol, 2,6-dimethylcyclohexanol (bp: 173° C.), and 3,5-dimethylcyclohexanol (bp 179° C.).

Specific examples of an alicyclic thiol compound solvent include cyclopentanethiol (bp: 132° C.) and cyclohexanethiol (bp: 158° C.).

Specific examples of an alicyclic ether compound solvent include cyclopentyl methyl ether, cyclopentyl ethyl ether (bp 135° C.), cyclopentyl propyl ether, cyclopentyl isopropyl ether, cyclopentyl normal butyl ether, cyclopentyl isobutyl ether, cyclopentyl-sec-butyl ether, cyclopentyl-tert-butyl ether, cyclohexyl methyl ether (bp: 135° C.), cyclohexyl ethyl ether (bp 164° C.), cyclohexyl propyl ether (bp 193° C.), cyclohexyl isopropyl ether, cyclohexyl normal butyl ether, cyclohexyl isobutyl ether, cyclohexyl-sec-butyl ether, cyclohexyl-tert-butyl ether, cyclohexyl vinyl ether, and 1-methoxy-4-methylcyclohexane (bp: 148° C.).

Specific examples of an alicyclic sulfide compound solvent include cyclopentyl methyl sulfide, cyclopentyl ethyl sulfide, dicyclopentyl sulfide, cyclohexyl methyl sulfide, and the like.

Specific examples of an alicyclic amine compound solvent include N-methylcyclopentylamine, N,N-dimethylcyclopentylamine, N-methylcyclohexylamine, N,N-dimethylcyclohexylamine, and the like.

Specific examples of an alicyclic amide compound solvent include N,N-dimethylcyclohexanecarboxamide.

Specific examples of an alicyclic ester compound solvent include ethyl cyclopropanecarboxylate (bp: 130° C.), propyl cyclopropanecarboxylate, isopropyl cyclopropanecarboxylate, normal butyl cyclopropanecarboxylate, isobutyl cyclopropanecarboxylate, sec-butyl cyclopropanecarboxylate, cyclopropyl cyclopropanecarboxylate, methyl cyclopentanecarboxylate (bp: 158° C.), ethyl cyclopentanecarboxylate, propyl cyclopentanecarboxylate, isopropyl cyclopentanecarboxylate, methyl cyclohexane carboxylate, ethyl cyclohexane carboxylate, propyl cyclohexane carboxylate, isopropyl cyclohexane carboxylate, cyclopropyl isobutyrate, and cyclopropyl pivalate.

Specific examples of an alicyclic ketone compound solvent include dicyclohexyl ketone, cyclohexyl methyl ketone, cyclohexyl ethyl ketone, and cyclohexyl isopropyl ketone.

Specific examples of an alicyclic carbonate compound solvent include cyclopentyl methyl carbonate and cyclohexyl methyl carbonate.

Specific examples of an alicyclic carboxylic acid compound solvent include cyclopropanecarboxylic acid, cyclobutanecarboxylic acid, cyclopentanecarboxylic acid, and cyclohexanecarboxylic acid.

Specific examples of an alicyclic nitrile compound solvent include cyclopentanecarbonitrile, cyclohexanecarbonitrile, and cyclopropanecarbonitrile.

The lower limit of the number of carbon atoms constituting the polar dispersion medium (C1) is 3 or more, preferably 4 or more, and more preferably 6 or more. The upper limit is preferably 15 or less, more preferably 12 or less, and still more preferably 10 or less.

The polar dispersion medium (C1) may have one polar group or a plurality of polar groups selected from the above-described group of polar groups in one molecule as long as the condition 2 is satisfied.

Among the polar dispersion media (C1), the alcohol solvent, the ether compound solvent, the ketone compound solvent, or the ester compound solvent is more preferred, and the ether compound solvent or the ketone compound solvent is particularly preferred. In the case of using these polar dispersion media (C1), it is possible to suppress the agglomeration of the coated active material (B) which is attributed to the hydrophilic surface and uniformly disperse the sulfide-based inorganic solid electrolyte (A), the coated active material (B), and the like.

Regarding the Log P value of the polar dispersion medium (C1), the upper limit is preferably 3.0 or less and more preferably 2.5 or less. The lower limit is preferably 0.5 or more and more preferably 1.5 or more. Here, the Log P value refers to a value calculated using ChemBioDrawVersion 12.0.2.1076 manufactured by CambridgeSoft Corporation.

Regarding the viscosity at 20° C. of the polar dispersion medium (C1), the lower limit is preferably 0.7 mPa·s or more, more preferably 0.8 mPa·s or more, and still more preferably 1.0 mPa·s or more. The upper limit is not particularly limited, but is preferably 10 mPa·s or less, more preferably 5.0 mPa·s or less, and still more preferably 3.0 mPa·s or less.

In a case in which the viscosity at 20° C. is in the above-described preferred range, the solid electrolyte composition of the embodiment of the invention which is a slurry exhibits a superior dispersion stability, and, in layers obtained by applying the solid electrolyte composition of the embodiment of the invention onto a base material, the respective components in the layers are evenly present (the layer thickness uniformity is excellent), and thus a superior ion conductivity and a superior binding property are exhibited.

Meanwhile, the lower limit of the viscosity at 20° C. of the solid electrolyte composition of the embodiment of the invention is preferably 30 mPa·s or more, more preferably 50 mPa·s or more, and still more preferably 100 mPa·s or more. The upper limit is not particularly limited, but is preferably 10,000 mPa·s or less, more preferably 1,000 mPa·s or less, and still more preferably 500 mPa·s or less.

The boiling point at a normal pressure (1,013 hPa) of the polar dispersion medium (C1) is preferably 100° C. or higher and more preferably 120° C. or higher. The upper limit is preferably 220° C. or lower and more preferably 180° C. or lower. In a case in which the boiling point at a normal pressure is in the above-described preferred range, layers obtained by applying the solid electrolyte composition of the embodiment of the invention onto a base material exhibit a superior layer thickness uniformity.

(2) Other Dispersion Medium

As the dispersion medium (C), the solid electrolyte composition may include a dispersion medium other than the polar dispersion medium (C1) (hereinafter, referred to as the "other dispersion medium") as long as the solid electrolyte composition includes the polar dispersion medium (C1) and exhibits the effect of the present invention. The other dispersion medium is not particularly limited as long as the effect of the present invention is exhibited, and examples thereof include an aliphatic compound solvent (for example, heptane, octane, cyclohexane, and methyl cyclohexane), an aromatic solvent (for example, toluene and xylene), a linear polar solvent (that is, a polar solvent not having the hydrocarbon group having a branched structure; examples thereof include methanol, ethanol, butanol, dibutyl ether, dimethoxyethane, and diethoxyethane), and the like.

(3) Dispersion Medium (C)

The content of the polar dispersion medium (C1) in the dispersion medium (C) is preferably 1% by mass or more, more preferably 5% by mass or more, and still more preferably 10% by mass or more. The upper limit is 50% by mass or less, more preferably 40% by mass or less, and still more preferably 30% by mass or less.

In a case in which the content is in the above-described preferred range, the solid electrolyte composition of the embodiment of the invention which is a slurry exhibits a superior dispersion stability.

The boiling point at a normal pressure (1,013 hPa) of the dispersion medium (C) is preferably 50° C. or higher and more preferably 70° C. or higher. The upper limit is preferably 250° C. or lower and more preferably 220° C. or lower.

The content of the dispersion medium (C) in the solid electrolyte composition of the embodiment of the invention is not particularly limited, but is preferably 20% to 90% by mass or more, more preferably 30% to 85% by mass, and particularly preferably 35% to 85% by mass.

The amount of moisture contained in the dispersion medium (C) is preferably 100 ppm or less, more preferably 30 ppm or less, and most preferably 10 ppm or less from the viewpoint of suppressing the decomposition of the inorganic solid electrolyte due to the contact between the inorganic solid electrolyte and water.

In the present specification, compounds, partial structures, or groups that are not clearly expressed as substituted or unsubstituted may have an appropriate substituent in the compounds, partial structures, or groups. What has been described above shall also apply to compounds that are not clearly expressed as substituted or unsubstituted. Preferred examples of the substituent include the substituent P described below.

Examples of the substituent P include the following substituents:

an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, 1-carboxymethyl, or the like), an alkenyl group (preferably an alkenyl group having 2 to 20 carbon atoms, for example, vinyl, allyl, oleyl, or the like), an alkynyl group (preferably an alkynyl group having 2 to 20 carbon atoms, for example, ethynyl, butadiynyl, phenylethynyl, or the like), a cycloalkyl group (preferably a cycloalkyl group having 3 to 20 carbon atoms, for example, cyclopropyl, cyclopentyl, cyclohexyl, 4-methylcyclohexyl, or the like; here, in the case of being referred to as an alkyl group in the present specification, generally, a cycloalkyl group is also referred to), an aryl group (preferably an aryl group having 6 to 26 carbon atoms, for example, phenyl, 1-naphthyl, 4-methoxyphenyl, 2-chlorophenyl, 3-methylphenyl, or the like), an aralkyl group (preferably an aralkyl group having 7 to 23 carbon atoms, for example, benzyl, phenethyl, or the like), a heterocyclic group (preferably a heterocyclic group having 2 to 20 carbon atoms, preferably a 5- or 6-membered heterocyclic group having at least one selected from an oxygen atom, a sulfur atom, or a nitrogen atom as a ring-constituting atom, for example, tetrahydropyranyl, tetrahydrofuranyl, 2-pyridyl, 4-pyridyl, 2-imidazolyl, 2-benzimidazolyl, 2-thiazolyl, 2-oxazolyl, pyrrolidone group, or the like), an alkoxy group (preferably an alkoxy group having 1 to 20 carbon atoms, for example, methoxy, ethoxy, isopropyloxy, benzyloxy, or the like), an aryloxy group (preferably an aryloxy group having 6 to 26 carbon atoms, for example, phenoxy, 1-naphthyloxy, 3-methylphenoxy, 4-methoxyphenoxy, or the like; here, in the case of being referred to as an alkoxy group in the present specification, generally, an aryloyl group is also referred to), an alkoxycarbonyl group (preferably an alkoxycarbonyl group having 2 to 20 carbon atoms, for example, ethoxycarbonyl, 2-ethylhexyloxycarbonyl, or the like), an aryloxycarbonyl group (preferably an aryloxycarbonyl group having 6 to 26 carbon atoms, for example, phenoxycarbonyl, 1-naphthyloxycarbonyl, 3-methylphenoxycarbonyl, 4-methoxyphenoxycarbonyl, or the like), an amino group (preferably an amino group, alkylamino group, or arylamino group having 0 to 20 carbon atoms, for example, amino, N,N-dimethylamino, N,N-diethylamino, N-ethylamino, anilino, or the like), a sulfamoyl group (preferably a sulfamoyl group having 0 to 20 carbon atoms, for example, N,N-dimethylsulfamoyl, N-phenylsulfamoyl, or the like), an acyl group (preferably an acyl group having 1 to 20 carbon atoms, for example, acetyl, propionyl, butyryl, or the like), an aryloyl group (preferably an aryloyl group having 7 to 23 carbon atoms, for example, benzoyl or the like; here, in the case of being referred to as an acyl group in the present specification, generally, an aryloyl group is also referred to), an acyloxy group (preferably an acyloxy group having 1 to 20 carbon atoms, for example, acetyloxy, or the like), an aryloyloxy group (preferably an aryloyloxy group having 7 to 23 carbon atoms, for example, benzoyloxy, or the like; here, in the case of being referred to as an acyloxy group in the present specification, generally, an aryloyloxy group is also referred to), a carbamoyl group (preferably a carbamoyl group having 1 to 20 carbon atoms, for example, N,N-dimethylcarbamoyl, N-phenylcarbamoyl, or the like), an acylamino group (preferably an acylamino group having 1 to 20 carbon atoms, for example, acetylamino, benzoylamino, or the like), an alkylsulfanyl group (preferably an alkylsulfanyl group having 1 to 20 carbon atoms, for example, methylsulfanyl, ethylsulfanyl, isopropylsulfanyl, benzylsulfanyl, or the like), an arylsulfanyl group (preferably an arylsulfanyl group having 6 to 26 carbon atoms, for example, phenylsulfanyl, 1-naphthylsulfanyl, 3-methylphenylsulfanyl, 4-methoxyphenylsulfanyl, or the like), an alkylsulfonyl group (preferably an alkylsulfonyl group having 1 to 20 carbon atoms, for example, methylsulfonyl, ethylsulfonyl, or the like), an arylsulfonyl group (preferably an arylsulfonyl group having 6 to 22 carbon atoms, for example, benzenesulfonyl or the like), a phosphoyl group (preferably a phosphoryl group having 0 to 20 carbon atoms, for example, $-OP(=O)(R^P)_2$), a phosphonyl group (preferably a phosphonyl group having 0 to 20 carbon atoms, for example, $-P(=O)(R^P)_2$), a phosphinyl group (preferably a phosphinyl group having 0 to 20 carbon atoms, for example, $-P(R^P)_2$), a (meth)acryloyl group, a (meth)acryloyloxy group, a (meth)acryloylimino group (a (meth)acrylamide group), a hydroxy group, a sulfanyl group, a carboxy group, a phosphate group, a phosphoric acid group, a sulfonic acid group, a cyano group, and a halogen atom (for example, a fluorine atom, a chlorine atom, a bromine atom, an iodine atom, or the like).

In addition, in the respective groups exemplified as the substituent P, the substituent P may be further substituted.

In a case in which a compound, a substituent, a linking group, and the like has an alkyl group, an alkylene group, an alkenyl group, an alkenylene group, an alkynyl group, an alkynylene group, and/or the like, the compound, the substituent, the linking group, and the like may have a cyclic shape or a chain shape, may be linear or branched, and may be substituted or unsubstituted as described above.

(Binder (D))

The solid electrolyte composition of the embodiment of the invention preferably contains a binder (D). Hereinafter, the binder (D) will also be simply referred to as the binder.

A binder that can be used in the present invention is not particularly limited as long as the binder is an organic polymer, and, for example, a binder made of a resin described below is preferred.

Examples of a fluorine-containing resin include polytetrafluoroethylene (PTFE), polyvinylene difluoride, and copolymers of polyvinylene difluoride and hexafluoropropylene (PVdF-HFP).

Examples of a hydrocarbon-based thermoplastic resin include polyethylene, polypropylene, styrene butadiene rubber (SBR), hydrogenated styrene butadiene rubber (HSBR), butylene rubber, acrylonitrile butadiene rubber, polybutadiene, and polyisoprene.

Examples of an acrylic resin include a variety of (meth)acrylmonomers, (meth)acrylamide monomers, and copolymers of monomers constituting these resins (preferably copolymers of acrylic acid and methyl acrylate).

In addition, copolymers with other vinyl-based monomers are also preferably used. Examples thereof include copolymers of methyl (meth)acrylate and styrene, copolymers of methyl (meth)acrylate and acrylonitrile, and copolymers of butyl (meth)acrylate, acrylonitrile, and styrene. In the present specification, a copolymer may be any of a statistic copolymer and a periodic copolymer and is preferably a blocked copolymer.

Examples of other resins include a polyurethane resin, a polyurea resin, a polyamide resin, a polyimide resin, a polyester resin, a polyether resin, a polycarbonate resin, a cellulose derivative resin, and the like.

These resins may be used singly or two or more resins may be used in combination.

The binder exhibits a strong binding property (the suppression of peeling from the collector and the improvement of the cycle service life by the binding of the solid interface) and is thus preferably at least one of an acrylic resin, a polyurethane resin, a polyurea resin, a polyimide resin, a polyamide resin, a polyether resin, a polycarbonate resin, a fluorine-containing resin, and a hydrocarbon-based thermoplastic resin which are described above. Meanwhile, the above-described resin and a resin other than the above-described resin may also be used in combination.

The binder preferably has a polar group (a) in order to enhance the wettability or adsorption property into particle surfaces. The polar group (a) is preferably a monovalent group including a hetero atom, for example, a monovalent group including a structure in which any of an oxygen atom, a nitrogen atom, and a sulfur atom and a hydrogen atom are bonded together, and specific examples thereof include a carboxy group, a hydroxy group, an amino group, a phosphate group, and a sulfo group.

The shape of the binder is not particularly limited and may be a particle shape or an irregular shape in the solid electrolyte composition, the solid electrolyte-containing sheet, or the all-solid state secondary battery.

In the present invention, the binder is preferably particles that are insoluble in the dispersion medium (C) from the viewpoint of the dispersion stability of the solid electrolyte composition. Here, "the binder is particles that are insoluble in the dispersion medium (C)" means that, even in a case in which the binder is added to the dispersion medium at 30° C. and left to stand for 24 hours, the average particle diameter does not decrease by 5% or more, and the degree of the decrease in the average particle diameter is preferably 3% or more and more preferably 1% or more.

Meanwhile, in a state in which the binder particles are not dissolved in the dispersion medium, the degree of the average particle diameter changed with respect to that before the addition is 0%.

In addition, the binder in the solid electrolyte composition preferably has an average particle diameter of 10 nm to 30 μm and is more preferably nanoparticles of 10 to 1,000 nm in order to suppress a decrease in the ion conductivity between the sulfide-based inorganic solid electrolyte (A) and the coated active material (B).

Unless particularly otherwise described, the average particle diameter of the binder particles and the average particle diameter of the binder described in examples refers to an average particle diameter based on measurement conditions and a definition described below.

One percent by mass of a dispersion liquid is prepared by diluting the binder particles using a random solvent (a dispersion medium that is used to prepare the solid electrolyte composition, for example, octane) in a 20 ml sample bottle. The diluted dispersion specimen is irradiated with 1 kHz ultrasonic waves for 10 minutes and then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., and the obtained volume-average particle diameter is used as the average particle diameter. Regarding other detailed conditions and the like, the description of JIS Z8828:2013 "Particle size analysis-Dynamic light scattering method" is referred to as necessary. Five specimens are produced and measured per level, and the average values thereof are employed.

Meanwhile, the average particle diameter can be measured from the produced all-solid state secondary battery by, for example, disassembling the battery, peeling the electrodes off, then, measuring the average particle diameters of the electrode materials according to the above-described method for measuring the average particle diameter of the polymer particles, and excluding the measurement value of the average particle diameter of particles other than the polymer particles which has been measured in advance.

Meanwhile, as the binder, a commercially available product can be used. In addition, the binder can also be prepared using an ordinary method.

The moisture concentration of a polymer constituting the binder is preferably 100 ppm (mass-based) or less.

In addition, the polymer constituting the binder may be used in a solid state or may be used in a state of a polymer particle dispersion liquid or a polymer solution.

The mass-average molecular weight of the polymer constituting the binder is preferably 10,000 or more, more preferably 20,000 or more, and still more preferably 30,000 or more. The upper limit is preferably 1,000,000 or less, more preferably 200,000 or less, and still more preferably 100,000 or less.

In a case in which a favorable decreasing property of the interface resistance and the maintaining property thereof in the case of being used in the all-solid state secondary battery are taken into account, the content of the binder in the solid electrolyte composition is preferably 0.01% by mass or more, more preferably 0.2% by mass or more, and still more preferably 0.4% by mass or more with respect to 100% by mass of the solid components. From the viewpoint of battery characteristics, the upper limit is preferably 10% by mass or less, more preferably 8% by mass or less, and still more preferably 5% by mass or less.

In the present invention, the mass ratio of the total mass (total amount) of the sulfide-based inorganic solid electrolyte and the coated active material to the mass of the binder [(the mass of the sulfide-based inorganic solid electrolyte and the mass of the coated active material)/the mass of the binder] is preferably in a range of 1,000 to 1. Furthermore, this ratio is more preferably 500 to 2 and still more preferably 250 to 10.

(Conductive Auxiliary Agent (E))

The solid electrolyte composition of the embodiment of the invention also preferably contains a conductive auxiliary agent. The conductive auxiliary agent is not particularly limited, and conductive auxiliary agents that are known as ordinary conductive auxiliary agents can be used. The conductive auxiliary agent may be, for example, graphite such as natural graphite or artificial graphite, carbon black such as acetylene black, Ketjen black, or furnace black, irregular carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, these conductive auxiliary agents may be used singly or two or more conductive auxiliary agents may be used.

(Dispersant)

The solid electrolyte composition of the embodiment of the invention may also contain a dispersant. The addition of the dispersant enables the suppression of the agglomeration of the electrode active material and the inorganic solid electrolyte even in a case in which the concentration of any of the coated active material and the sulfide-based inorganic solid electrolyte is high and a case in which the particle diameters are small and the surface area increases and the formation of a uniform active material layer and a uniform solid electrolyte layer. As the dispersant, a dispersant that is generally used for an all-solid state secondary battery can be appropriately selected and used. Generally, a compound intended for particle adsorption and steric repulsion and/or electrostatic repulsion is preferably used.

(Lithium Salt)

The solid electrolyte composition of the embodiment of the invention may also contain a lithium salt.

The lithium salt is not particularly limited, and, for example, the lithium salt described in Paragraphs 0082 to 0085 of JP2015-088486A is preferred.

The content of the lithium salt is preferably 0 parts by mass or more and more preferably 5 parts by mass or more with respect to 100 parts by mass of the sulfide-based inorganic solid electrolyte. The upper limit is preferably 50 parts by mass or less and more preferably 20 parts by mass or less.

(Preparation of Solid Electrolyte Composition)

The solid electrolyte composition of the embodiment of the invention can be prepared by dispersing the sulfide-based inorganic solid electrolyte (A) and the coated active material (B) in the presence of the dispersion medium (C) including the polar dispersion medium (C1) to produce a slurry.

The slurry can be produced by mixing the sulfide-based inorganic solid electrolyte (A), the coated active material (B), and the dispersion medium (C) including the polar dispersion medium (C1) using a variety of mixers. The mixing device is not particularly limited, and examples thereof include a ball mill, a beads mill, a planetary mixer, a blade mixer, a roll mill, a kneader, and a disc mill. The mixing conditions are not particularly limited; however, in the case of using a ball mill, the inorganic solid electrolyte and the dispersion medium are preferably mixed together at 150 to 700 rpm (rotation per minute) for one hour to 24 hours. In addition, the order of adding the respective components is not particularly limited as long as the effect of the present invention is exhibited; however, generally, the dispersion medium (C) including the polar dispersion medium (C1) is prepared, and the prepared dispersion medium (C) is mixed with the sulfide-based inorganic solid electrolyte (A) and the coated active material (B).

In the case of preparing a solid electrolyte composition containing components such as the binder (D), the conductive auxiliary agent (E), and a particle dispersant, the components may be added and mixed at the same time as a dispersion step of the sulfide-based inorganic solid electrolyte (A) or the like or may be separately added and mixed.

[Sheet for all-Solid State Secondary Battery]

The solid electrolyte-containing sheet of the embodiment of the invention has a layer containing (A) the sulfide-based inorganic solid electrolyte having a conductivity of an ion of a metal belonging to Group I or II of the periodic table, (B) the active material having a surface coated with the oxide having an ion conductivity; and the polar dispersion medium (C1), and the content of the polar dispersion medium (C1) in the layer is 1 ppm or more and 10,000 ppm or less.

The solid electrolyte-containing sheet of the embodiment of the invention, particularly, the solid electrolyte-containing sheet of the embodiment of the invention that is produced using the solid electrolyte composition of the embodiment of the invention contains the sulfide-based inorganic solid electrolyte (A) in which a decrease in the ion conductivity accompanied by the decomposition of the sulfide-based inorganic solid electrolyte (A) is suppressed, has the sulfide-based inorganic solid electrolyte (A) and the coated active material (B) uniformly present in the layer at a high level, and is excellent in terms of the uniformity of the layer thickness. As a result, an all-solid state secondary battery into which the solid electrolyte-containing sheet of the embodiment of the invention is combined is considered to exhibit an effect that is excellent in terms of the initial voltage and the cycle characteristics.

The solid electrolyte-containing sheet of the embodiment of the invention can be preferably used in all-solid state secondary batteries and is modified in a variety of aspects depending on the uses. Examples of the solid electrolyte-containing sheet that is used in the all-solid state secondary battery include a sheet that is preferably used in a solid electrolyte layer (also referred to as an electrode sheet for an all-solid state secondary battery) and a sheet that is preferably used in an electrode and a laminate of an electrode and a solid electrolyte layer (an electrode sheet for an all-solid state secondary battery). The solid electrolyte-containing sheet of the embodiment of the invention is preferably used for an electrode sheet for an all-solid state secondary battery. In the present invention, a variety of sheets described above will be collectively referred to as a sheet for an all-solid state secondary battery in some cases.

The sheet for an all-solid state secondary battery is a sheet having a solid electrolyte layer or an active material layer (electrode layer), and examples thereof include an aspect of a sheet having a solid electrolyte layer or an active material (electrode layer) on a base material and a sheet made of a solid electrolyte layer or an active material layer (electrode layer) (a sheet not having a base material). Hereinafter, a sheet in the aspect of a sheet having a solid electrolyte layer or an active material layer (electrode layer) on a base material will be described in detail.

This sheet for an all-solid state secondary battery may further have other layers as long as the sheet has the base material and the solid electrolyte layer or the active material layer, but a sheet containing an active material is classified into an electrode sheet for an all-solid state secondary battery described below. Examples of other layers include a protective layer, a collector, a coating layer (a collector, a solid electrolyte layer, or an active material layer), and the like.

Examples of the solid electrolyte sheet for an all-solid state secondary battery include a sheet having a solid electrolyte layer and a protective layer on a base material in this order.

The base material is not particularly limited as long as the base material is capable of supporting the solid electrolyte layer, and examples thereof include sheet bodies (plate-like bodies) of materials, organic materials, inorganic materials, and the like described in the section of the collector described below. Examples of the organic materials include a variety of polymers and the like, and specific examples thereof include polyethylene terephthalate, polypropylene, polyethylene, cellulose, and the like. Examples of the inorganic materials include glass, ceramic, and the like.

The layer thickness of the solid electrolyte layer in the sheet for an all-solid state secondary battery is identical to the layer thickness of the solid electrolyte layer described in the section of an all-solid state secondary battery of the embodiment of the invention.

This sheet is obtained by forming a film of the solid electrolyte composition for forming the solid electrolyte layer (by means of application and drying) on the base material (possibly, through other layers) and forming a solid electrolyte layer on the base material.

Here, the solid electrolyte composition of the embodiment of the invention can be prepared using the above-described method.

An electrode sheet for an all-solid state secondary battery of the embodiment of the invention (also simply referred to as "the electrode sheet") is a sheet for forming an active material layer in an all-solid state secondary battery and an electrode sheet having an active material layer on a metal foil as a collector. This electrode sheet is generally a sheet having a collector and an active material layer, and an aspect of having a collector, an active material layer, and a solid electrolyte layer in this order and an aspect of having a collector, an active material layer, a solid electrolyte layer, and an active material layer in this order are also considered as the electrode sheet.

The layer thicknesses of the respective layers constituting the electrode sheet are identical to the layer thicknesses of individual layers described in the section of an all-solid state secondary battery of the embodiment of the invention. In addition, the constitution of the respective layers constituting the electrode sheet is identical to the constitution of individual layers described in the section of an all-solid state secondary battery of the embodiment of the invention described below.

The electrode sheet is obtained by forming a film of the solid electrolyte composition of the embodiment of the invention (by means of application and drying) on the metal foil and forming an active material layer on the metal foil.

[All-Solid State Secondary Battery]

An all-solid state secondary battery of the embodiment of the invention has a positive electrode, a negative electrode facing the positive electrode, and a solid electrolyte layer between the positive electrode and the negative electrode. The positive electrode has a positive electrode active material layer on a positive electrode collector. The negative electrode has a negative electrode active material layer on a negative electrode collector.

At least one layer of the positive electrode active material layer or the negative electrode active material layer is preferably formed using the solid electrolyte composition of the embodiment of the invention, and the positive electrode active material layer and the negative electrode active material layer are more preferably formed using the solid electrolyte composition of the embodiment of the invention.

Preferably, the kinds and the content ratio of the components of the positive electrode active material layer and the negative electrode active material layer formed using the solid electrolyte composition of the embodiment of the invention are basically identical to those in the solid content of the solid electrolyte composition.

Hereinafter, a preferred embodiment of the present invention will be described with reference to FIG. 1, but the present invention is not limited thereto.

[Positive Electrode Active Material Layer, Solid Electrolyte Layer, and Negative Electrode Active Material Layer]

In the all-solid state secondary battery 10, at least one layer of the positive electrode active material layer or the negative electrode active material layer is produced using the solid electrolyte composition of the embodiment of the invention.

In a case in which the positive electrode active material layer 4 and/or the negative electrode active material layer 2 are produced using the solid electrolyte composition of the embodiment of the invention containing an active material, the positive electrode active material layer 4 and the negative electrode active material layer 2 respectively include a coat positive electrode active material or a coat negative electrode active material and further include the sulfide-based inorganic solid electrolyte (A) and the polar dispersion medium (C1), and the content of the polar dispersion medium (C1) in the active material layer is 1 ppm or more and 10,000 ppm or less.

Meanwhile, regarding the content proportion of the polar dispersion medium (C1) in the active material layer of the all-solid state secondary battery of the embodiment of the invention, it is possible to refer to the method described in the following section of the solid electrolyte-containing sheet of the embodiment of the invention and measure the content proportion using the method.

Each of the sulfide-based inorganic solid electrolytes (A) and the coated active materials (B) that the positive electrode active material layer 4 and the negative electrode active material layer 2 contain may be from the same kind or different kinds.

In the present invention, at least one layer of the positive electrode active material layer or the negative electrode active material layer in the all-solid state secondary battery is a layer which is produced using the solid electrolyte composition containing the sulfide-based inorganic solid electrolyte (A) and the coated active material (B) and contains the sulfide-based inorganic solid electrolyte (A) and the coated active material (B).

The all-solid state secondary battery of the embodiment of the invention, particularly, the all-solid state secondary battery of the embodiment of the invention which is produced using the solid electrolyte composition of the embodiment of the invention exhibits a high initial voltage and favorable cycle characteristics. This is considered to be because a decrease in the ion conductivity accompanied by the decomposition of the sulfide-based inorganic solid electrolyte (A) is suppressed, the sulfide-based inorganic solid electrolyte (A) and the coated active material (B) are present in the layer in a well-dispersed manner, and the uniformity of the layer thickness is excellent.

[Collector (Metal Foil)]

The positive electrode collector 5 and the negative electrode collector 1 are preferably an electron conductor.

In the present invention, there are cases in which any or both of the positive electrode collector and the negative electrode collector will be simply referred to as the collector.

As a material forming the positive electrode collector, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum and an aluminum alloy are more preferred.

As a material forming the negative electrode collector, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 to 500 μm. In addition, the surface of the collector is preferably provided with protrusions and recesses by means of a surface treatment.

In the present invention, a functional layer, member, or the like may be appropriately interposed or disposed between the respective layers of the negative electrode collector, the negative electrode active material layer, the solid electrolyte layer, the positive electrode active material layer, and the positive electrode collector or on the outside thereof. In addition, the respective layers may be composed of a single layer or multiple layers.

[Chassis]

It is possible to produce the basic structure of the all-solid state secondary battery by disposing the respective layers described above. Depending on the use, the basic structure may be directly used as an all-solid state secondary battery, but the basic structure may be used after being enclosed in an appropriate chassis in order to have a dry battery form. The chassis may be a metallic chassis or a resin (plastic) chassis. In a case in which a metallic chassis is used, examples thereof include an aluminum alloy chassis and a stainless-steel chassis. The metallic chassis is preferably classified into a positive electrode-side chassis and a negative electrode-side chassis and electrically connected to the positive electrode collector and the negative electrode collector respectively. The positive electrode-side chassis and the negative electrode-side chassis are preferably integrated by being joined together through a gasket for short circuit prevention.

[Manufacturing of Solid Electrolyte-Containing Sheet]

The solid electrolyte-containing sheet of the embodiment of the invention is obtained by forming a film of the solid electrolyte composition of the embodiment of the invention on a base material (possibly, through a different layer) (application and drying) and forming a solid electrolyte layer on the base material.

With the above-described aspect, it is possible to produce a solid electrolyte-containing sheet having a layer containing the sulfide-based inorganic solid electrolyte (A), the active material (B) having a surface coated with an oxide having an ion conductivity, and the polar dispersion medium (C1) on a base material.

Additionally, regarding steps such as application, it is possible to use a method described in the following section of the manufacturing of an all-solid state secondary battery.

Meanwhile, the solid electrolyte-containing sheet of the embodiment of the invention contains 1 ppm or more and 10,000 ppm or less of the polar dispersion medium (C1) in the layer as long as the battery performance is not affected.

Meanwhile, the content proportion of the polar dispersion medium (C1) in the layer of the solid electrolyte-containing sheet of the embodiment of the invention can be measured using the following method.

A 20 mm×20 mm specimen was cut out from the solid electrolyte-containing sheet by punching and immersed in heavy tetrahydrofuran in a glass bottle. The obtained eluted substance is filtered using a syringe filter, and a quantitative operation by $^1$H-NMR is carried out. The correlation between the $^1$H-NMR peak surface area and the amount of the solvent is obtained by producing a calibration curve.

[All-Solid State Secondary Battery and Manufacturing of Electrode Sheet for all-Solid State Secondary Battery]

The all-solid state secondary battery and the electrode sheet for an all-solid state secondary battery can be manufactured using an ordinary method. Specifically, the all-solid state secondary battery and the electrode sheet for an all-solid state secondary battery can be manufactured by forming the respective layers described above using the solid electrolyte composition of the embodiment of the invention or the like. Hereinafter, the manufacturing method will be described in detail.

The all-solid state secondary battery of the embodiment of the invention can be manufactured using a method including (through) a step of applying the solid electrolyte composition of the embodiment of the invention onto a base material (for example, a metal foil which serves as a collector) and forming a coated film (film manufacturing).

For example, a solid electrolyte composition containing a positive electrode active material is applied as a material for a positive electrode (a composition for a positive electrode) onto a metal foil which is a positive electrode collector so as to form a positive electrode active material layer, thereby producing a positive electrode sheet for an all-solid state secondary battery. Next, a solid electrolyte composition for forming a solid electrolyte layer is applied onto the positive electrode active material layer so as to form a solid electrolyte layer. Furthermore, a solid electrolyte composition containing a negative electrode active material is applied as a material for a negative electrode (a composition for a negative electrode) onto the solid electrolyte layer so as to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can be produced by enclosing the all-solid state secondary battery in a chassis as necessary.

In addition, it is also possible to manufacture an all-solid state secondary battery by carrying out the methods for forming the respective layers in a reverse order so as to form a negative electrode active material layer, a solid electrolyte layer, and a positive electrode active material layer on a negative electrode collector and overlaying a positive electrode collector thereon.

As another method, the following method can be exemplified. That is, a positive electrode sheet for an all-solid state secondary battery is produced as described above. In addition, a solid electrolyte composition containing a negative electrode active material is applied as a material for a negative electrode (a composition for a negative electrode) onto a metal foil which is a negative electrode collector so as to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. An all-solid state secondary battery can be manufactured as described above.

As still another method, the following method can be exemplified. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, a solid electrolyte composition is applied onto a base material, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated together so as to sandwich the solid electrolyte layer that has been peeled off from the base material. An all-solid state secondary battery can be manufactured as described above.

An all-solid state secondary battery can be manufactured by combining the above-described forming methods. For example, a positive electrode sheet for an all-solid state secondary battery, a negative electrode sheet for an all-solid state secondary battery, and a solid electrolyte sheet for an all-solid state secondary battery are produced respectively. Next, a solid electrolyte layer peeled off from a base material is laminated on the negative electrode sheet for an all-solid state secondary battery and is then attached to the positive electrode sheet for an all-solid state secondary battery, whereby an all-solid state secondary battery can be manufactured. In this method, it is also possible to laminate the solid electrolyte layer on the positive electrode sheet for an all-solid state secondary battery and attach the solid electrolyte layer to the negative electrode sheet for an all-solid state secondary battery.

(Formation of Individual Layers (Film Formation))

The method for applying the solid electrolyte composition is not particularly limited and can be appropriately selected. Examples thereof include coating (preferably wet-type coating), spray coating, spin coating, dip coating, slit coating, stripe coating, and bar coating.

At this time, the solid electrolyte composition may be dried after being applied or may be dried after being applied to multiple layers. The drying temperature is not particularly limited. The lower limit is preferably 30° C. or higher, more preferably 60° C. or higher, and still more preferably 80° C. or higher, and the upper limit is preferably 300° C. or lower, more preferably 250° C. or lower, and still more preferably 200° C. or lower. In a case in which the compositions are heated in the above-described temperature range, it is possible to remove the dispersion medium (C) and form a solid state. In addition, the temperature is not excessively increased, and the respective members of the all-solid state secondary battery are not impaired, which is preferable. Therefore, in the all-solid state secondary battery, excellent total performance is exhibited, and it is possible to obtain a favorable binding property.

After the production of the applied solid electrolyte composition or the all-solid state secondary battery, the respective layers or the all-solid state secondary battery is preferably pressurized. In addition, the respective layers are also preferably pressurized in a state of being laminated together. Examples of the pressurization method include a hydraulic cylinder pressing machine and the like. The welding pressure is not particularly limited, but is, generally, preferably in a range of 50 to 1,500 MPa.

In addition, the applied solid electrolyte composition may be heated at the same time as pressurization. The heating temperature is not particularly limited, but is generally in a range of 30° C. to 300° C. The respective layers or the all-solid state secondary battery can also be pressed at a temperature higher than the glass transition temperature of the sulfide-based inorganic solid electrolyte.

The pressurization may be carried out in a state in which the applied solvent or dispersion medium has been dried in advance or in a state in which the solvent or the dispersion medium remains.

Meanwhile, the respective compositions may be applied at the same time, and the application, the drying, and the pressing may be carried out simultaneously and/or sequentially. The respective compositions may be applied to separate base materials and then laminated by means of transfer.

The atmosphere during the pressurization is not particularly limited and may be any one of in the atmosphere, under the dried air (the dew point: −20° C. or lower), in an inert gas (for example, in an argon gas, in a helium gas, or in a nitrogen gas), and the like.

The pressing time may be a short time (for example, within several hours) at a high pressure or a long time (one day or longer) under the application of an intermediate pressure. In the case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure can be changed depending on the area or film thickness of the portion under pressure. In addition, it is also possible to change the same portion with a pressure that varies stepwise.

A pressing surface may be flat or roughened.

(Initialization)

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of all-Solid State Secondary Battery]

The all-solid state secondary battery of the embodiment of the invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer usages include automobiles (electric cars and the like), electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military usages and universe usages. In addition, the all-solid state secondary battery can also be combined with solar batteries.

According to the preferred embodiment of the present invention, individual application forms as described below are derived.

[1] All-solid state secondary batteries in which at least one layer of a positive electrode active material layer or a negative electrode active material layer contains the binder (D) and/or the conductive auxiliary agent (E).

[2] Methods for manufacturing an all-solid state secondary battery in which at least one layer of a positive electrode active material layer or a negative electrode active material layer is formed by applying a slurry having the sulfide-based inorganic solid electrolyte (A), the coated active material (B), the binder (D), and/or the conductive auxiliary agent (E) dispersed using the dispersion medium (C) in a wet manner.

[3] Electrode sheets for a battery formed by applying the solid electrolyte composition on a metal foil to form a film.

[4] Methods for manufacturing an electrode sheet for a battery in which the solid electrolyte composition is applied onto a metal foil, thereby forming a film.

As described in the preferred embodiments [2] and [4], preferred methods for manufacturing the all-solid state secondary battery and the electrode sheet for a battery are all wet-type processes. Therefore, even in a region in at least one layer of the positive electrode active material layer or the negative electrode active material layer in which the content of the sulfide-based inorganic solid electrolyte is as low as 10% by mass or less, the adhesiveness between the coated active material (B) and the sulfide-based inorganic solid electrolyte (A), an efficient ion conduction path can be maintained, and it is possible to manufacture an all-solid state secondary battery having a high energy density (Wh/kg) and a high output density (W/kg) per battery mass.

All-solid state secondary batteries refer to secondary batteries having a positive electrode, a negative electrode, and an electrolyte which are all composed of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery. All-solid state secondary batteries are classified into organic (high-molecular-weight) all-solid state secondary batteries in which a high-molecular-weight compound such as polyethylene oxide is used as an electrolyte and inorganic all-solid state secondary batteries in which the Li—P—S-based glass, LLT, LLZ, or the like is used. Meanwhile, the application of organic compounds to inorganic all-solid state secondary batteries is not inhibited, and organic compounds can also be applied as binders or additives of positive electrode active materials, negative electrode active materials, and inorganic solid electrolytes.

Inorganic solid electrolytes are differentiated from electrolytes in which the above-described high-molecular-weight compound is used as an ion conductive medium (high-molecular-weight electrolyte), and inorganic compounds serve as ion conductive media.

Specific examples thereof include the Li—P—S glass, LLT, and LLZ. Inorganic solid electrolytes do not emit positive ions (Li ions) and exhibit an ion transportation function. In contrast, there are cases in which materials serving as an ion supply source which is added to electrolytic solutions or solid electrolyte layers and emits positive ions (Li ions) are referred to as electrolytes; however, in the case of being differentiated from electrolytes as the ion transportation materials, the materials are referred to as "electrolyte salts" or "supporting electrolytes". Examples of the electrolyte salts include LiTFSI.

In the present invention, "compositions" refer to mixtures obtained by uniformly mixing two or more components. Here, compositions may partially include agglomeration or uneven distribution as long as the compositions substantially maintain uniformity and exhibit desired effects.

EXAMPLES

Hereinafter, the present invention will be described in more detail on the basis of examples. Meanwhile, the present invention is not interpreted to be limited thereto. "Parts" and "%" that represent compositions in the following examples are mass-based unless particularly otherwise described. In addition, "room temperature" refers to 25° C.

Reference Example 1

<Synthesis of Sulfide-Based Inorganic Solid Electrolyte>
—Synthesis of Li—P—S-Based Glass—

As a sulfide-based inorganic solid electrolyte, Li—P—S-based glass was synthesized with reference to a non-patent document of T. Ohtomo, A. Hayashi, M. Tatsumisago, Y. Tsuchida, S. HamGa, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a globe box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, injected into an agate mortar, and mixed using an agate muddler for five minutes. Meanwhile, the mixing ratio between $Li_2S$ and $P_2S_5$ was set to 75:25 in terms of molar ratio.

Sixty six zirconia beads having a diameter of 5 mm were injected into a 45 mL zirconia container (manufactured by Fritsch Japan Co., Ltd.), the full amount of the mixture was injected thereinto, and the container was sealed in an argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours, thereby obtaining yellow powder (6.20 g) of a sulfide-based inorganic solid electrolyte (Li—P—S-based glass, hereinafter, also abbreviated as LPS). The volume-average particle diameter was 15 μm.

Reference Example 2

<Synthesis of Coated Active Material>
(1) Coated Active Material (B-1): Synthesis of Ti Oxide-Coated NCA Dehydrated ethanol (600 mL) was added to a 2 L flask, lithium ethoxide (0.26 g, 5 mmol), titanium tetraisopropoxide (1.42 g, 5 mmol), and acetyl acetone (0.5 g, 5 mmol) were added thereto, and the components were stirred in a nitrogen atmosphere, thereby forming a $Li_4Ti_5O_{12}$ (LTO) sol. $LiNi_{0.85}Co_{0.10}Al_{0.05}O_2$(NCA) (208 g) was added thereto and stirred at 25° C. in a nitrogen atmosphere for 30 minutes. Ethanol was removed at 50° C. and a reduced pressure, and then the obtained powder was fired at 350° C. for 30 minutes and further dried at 120° C. for four hours, thereby obtaining an active material NCA coated with LTO (hereinafter, abbreviated as LTO-coated NCA, which shall apply to coated active materials described below) as a coated active material (B-1).

(2) Coated Active Material (B-2): Synthesis of Zr Oxide-Coated NCA $Li_2ZrO_3$ (LZO)-coated NCA was obtained as a coated active material (B-2) using the same method as in (1) the synthesis of the coated active material (B-1) except for the fact that the titanium tetraisopropoxide was changed to zirconium tetrapropoxide, and the dehydrated ethanol was changed to dehydrated propanol.

(3) Coated Active Material (B-3): Synthesis of Nb Oxide-Coated NCA $LiNbO_3$ (LNbO)-coated NCA was obtained as a coated active material (B-3) using the same method as in (1) the synthesis of the coated active material (B-1) except for the fact that the titanium tetraisopropoxide was changed to niobium pentaethoxide.

(4) Coated Active Material (B-4): Synthesis of Ti Oxide-Coated NMC

LTO-coated NMC was obtained as a coated active material (B-4) using the same method as in (1) the synthesis of the coated active material (B-1) except for the fact that $LiNi_{1/3}Co_{1/3}Mn_{1/3}O_2$(NMC) was used instead of NCA.

(5) Coated Active Material (B-5): Synthesis of Ti Oxide-Coated Graphite

LTO-coated graphite was obtained as a coated active material (B-5) using the same method as in (1) the synthesis of the coated active material (B-1) except for the fact that graphite was used instead of NCA.

Example 1

<Preparation of Individual Compositions>
(1) Preparation of Solid Electrolyte Composition S-1

One hundred eighty zirconia beads having a diameter of 5 mm were injected into a 45 mL zirconia container (manufactured by Fritsch Japan Co., Ltd.), and LPS synthesized above (1.0 g), the coated active material (B-1) synthesized above (4.0 g), a binder (D-1) (0.05 g, the mass of a solid component), and a polar dispersion medium (C1) (5.0 g) were injected thereinto. After that, the container was set in a planetary ball mill P-7 (trade name) manufactured by Fritsch Japan Co., Ltd., the components were continuously mixed together at a temperature of 25° C. and a rotation speed of 150 rpm for two hours, thereby preparing a solid electrolyte composition S-1.

(2) Preparation of Solid Electrolyte Compositions S-2 to S-13 and T-1 to T-4

Solid electrolyte compositions S-2 to S-13 and T-1 to T-4 were prepared using the same method as for the solid electrolyte composition S-1 except for the fact that the composition was changed as shown in Table 1. Meanwhile, in the solid electrolyte compositions in which the polar dispersion medium (C1) and a dispersion medium (C2) were used, the total amount of the dispersion media used was 5.0 g in terms of the mass ratio shown in Table 1.

The compositions of the solid electrolyte compositions were summarized in Table 1.

TABLE 1

| No. | Sulfide-based inorganic solid electrolyte (A) | % by mass | Coated active material (B) | % by mass | Dispersion medium (C) Polar dispersion medium (C1) | Dispersion medium (C2) | Mass ratio (C1)/(C2) | % by mass | Binder (D) | % by mass (mass of solid component) | Conductive auxiliary agent (E) | % by mass | Note |
|---|---|---|---|---|---|---|---|---|---|---|---|---|---|
| S-1 | LPS | 9.9 | B-1 | 39.8 | Diisopropyl ether | — | — | 49.8 | D-1 | 0.5 | — | — | Present Invention |
| S-2 | LPS | 9.9 | B-1 | 39.8 | Diisopropyl ketone | — | — | 49.8 | D-2 | 0.5 | — | — | Present Invention |
| S-3 | LPS | 9.9 | B-2 | 39.8 | Cyclopentanol | — | — | 49.8 | D-3 | 0.5 | — | — | Present Invention |
| S-4 | LPS | 15 | B-3 | 35 | Isopropyl isobutyrate | — | — | 50 | — | — | — | — | Present Invention |
| S-5 | LPS | 15 | B-4 | 35 | Cyclopentyl ethyl ether | — | — | 49.5 | D-5 | 0.5 | — | — | Present Invention |
| S-6 | LPS | 20 | B-5 | 30 | Isopropyl cyclopropanecarboxylate | — | — | 49.8 | D-5 | 0.2 | — | — | Present Invention |
| S-7 | LPS | 10 | B-1 | 40 | Ethyl cyclopropanecarboxylate | Cyclohexane | 50/50 | 49.8 | D-1 | 0.2 | — | — | Present Invention |
| S-8 | LPS | 10 | B-1 | 40 | Diisopropyl ketone | Octane | 5/95 | 49.9 | D-2 | 0.1 | — | — | Present Invention |
| S-9 | LPS | 10 | B-1 | 40 | Isopropanol | Cyclohexane | 2/98 | 48.7 | D-4 | 0.3 | AB | 1.0 | Present Invention |
| S-10 | LPS | 12 | B-1 | 48 | Cyclopentyl ethyl ether | Toluene | 10/90 | 38.7 | D-5 | 0.3 | AB | 1.0 | Present Invention |
| S-11 | LPS | 12 | B-1 | 48 | Cyclohexyl isopropyl ether | Heptane | 5/95 | 38.2 | D-4 | 0.3 | VGCF | 1.5 | Present Invention |

TABLE 1-continued

| No. | Sulfide-based inorganic solid electrolyte (A) % by mass | Coated active material (B) | (B) % by mass | Polar dispersion medium (C1) | Dispersion medium (C2) | Mass ratio (C1)/(C2) | % by mass | Binder (D) | % by mass (mass of solid component) | Conductive auxiliary agent (E) | % by mass | Note |
|---|---|---|---|---|---|---|---|---|---|---|---|---|
| S-12 | LPS 12 | B-1 | 48 | Isopropyl cyclohexane carboxylate | Methyl cyclohexane | 5/95 | 38.2 | D-5 | 0.3 | VGCF | 1.5 | Present Invention |
| S-13 | LPS 12 | B-1 | 48 | Cyclohexyl methyl ether | Methyl cyclohexane | 1/99 | 38.2 | D-5 | 0.3 | VGCF | 1.5 | Present Invention |
| T-1 | LPS 10 | B'-1 | 40 | — | Toluene | — | 48 | D-1 | 1.0 | AB | 1.0 | Comparative Example |
| T-2 | LPS 15 | B-1 | 35 | — | Butyl acetate | — | 48.5 | D-1 | 1.5 | — | — | Comparative Example |
| T-3 | LPS 20 | B-5 | 30 | — | Heptane | — | 49 | D-2 | 1.0 | — | — | Comparative Example |
| T-4 | LPS 20 | B'-5 | 30 | — | Heptane | — | 50 | — | — | — | — | Comparative Example |

<Notes of Table>

LPS: Li—P—S-based glass synthesized above

B-1 to B-5: Coated active materials synthesized above

B'-1: Uncoated NCA (manufactured by JFE Mineral Co., Ltd.)

B'-5: Uncoated graphite (manufactured by Hitachi Chemical Co., Ltd.)

D-1: PVdF-HFP (manufactured by Arkema S. A., vinylene difluoride-hexafluoropropylene copolymer)

D-2: SBR (manufactured by JSR Corporation, trade name: DYNARON 1321P, styrene butadiene rubber)

D-3: An acrylic acid-methyl acrylate copolymer prepared using the following method (20/80 molar ratio, Mw: 25,000)

Acrylic acid (manufactured by Wako Pure Chemical Industries, Ltd.) (1.2 g) and methyl acrylate (4.2 g) (manufactured by Wako Pure Chemical Industries, Ltd.) were dissolved in methyl ethyl ketone (MEK) (30 g) in a 100 mL three-neck flask and were substituted with nitrogen while being heated and stirred at 75° C. Azoisobutyronitrile (V-60: trade name, manufactured by Wako Pure Chemical Industries, Ltd.) (0.15 g) was added to this solution and heated and stirred at 75° C. for six hours in a nitrogen atmosphere. A polymer was precipitated from the obtained polymer solution using hexane, and the polymer was filtered, washed with hexane, and then dried, thereby obtaining white powder of a binder (D-3).

D-4: Acrylic latex (a binder (B-1) described in JP2015-88486A, an average particle diameter: 198 nm (dispersion medium: heptane))

D-5: Urethane polymer (an exemplary compound (44) described in JP2015-88480A, mass-average molecular weight: 16,200)

Meanwhile, the average particle diameter of the binder is shown only for the binder that was present in the dispersion medium in a particle shape.

AB: Acetylene black

VGCF: Vapor grown carbon fiber (carbon nanotube, manufactured Showa Denko K. K.)

In the column of the mass ratio and the % by mass of the dispersion medium (C), the mass ratio and the % by mass including the dispersion medium included in the binder (D) are shown.

<Evaluation>

On the solid electrolyte compositions of the present invention (examples) and the comparative examples produced above, the following tests were carried out, and the results are shown in Table 2.

[Test Example 1] Dispersion Stability (Sedimentation Property) Test

The solid electrolyte composition immediately after being produced was added up to 6 cm in height to an 8 cm-high glass testing tube (10 mmϕ) and left to stand at 25° C. for one hour, and then the height of the separated supernatant was visually measured, thereby evaluating the dispersion stability using the following evaluation standards. The evaluation standards "3" to "5" are the passing levels. The results are shown in Table 2.

—Evaluation Standards—

5: Height of supernatant/height of total amount<0.07

4: 0.07≤height of supernatant/height of total amount<0.15

3: 0.15≤height of supernatant/height of total amount<0.3

2: 0.3≤height of supernatant/height of total amount<0.5

1: 0.5≤height of supernatant/height of total amount

[Total Amount: The Total Amount of the Solid Electrolyte Composition that was a Slurry, Supernatant: A Supernatant Liquid Generated by the Sedimentation of the Solid Component of the Solid Electrolyte Composition]

(Production of Electrode Sheet for all-Solid State Secondary Battery)

Each of the solid electrolyte compositions obtained above was applied onto a 20 μm-thick aluminum foil using an applicator (trade name: SA-201 Baker type applicator, manufactured by Tester Sangyo Co., Ltd.) and heated at 80° C. for two hours, thereby drying the solid electrolyte composition. After that, the dried solid electrolyte composition was heated and pressurized using a heat pressing machine at a temperature of 120° C. and a pressure of 600 MPa for 10 seconds so as to obtain a predetermined density, thereby obtaining each of electrode sheets for an all-solid state secondary battery Nos. 101 to 113 and c11 to c14 having an electrode active material layer laminated on the aluminum foil. The film thickness of the electrode active material layer was 100 μm.

<Evaluation>

On the produced electrode sheets for an all-solid state secondary battery, the following tests were carried out, and the results are shown in Table 2.

[Test Example 2] Ion Conductivity

Figure 2:
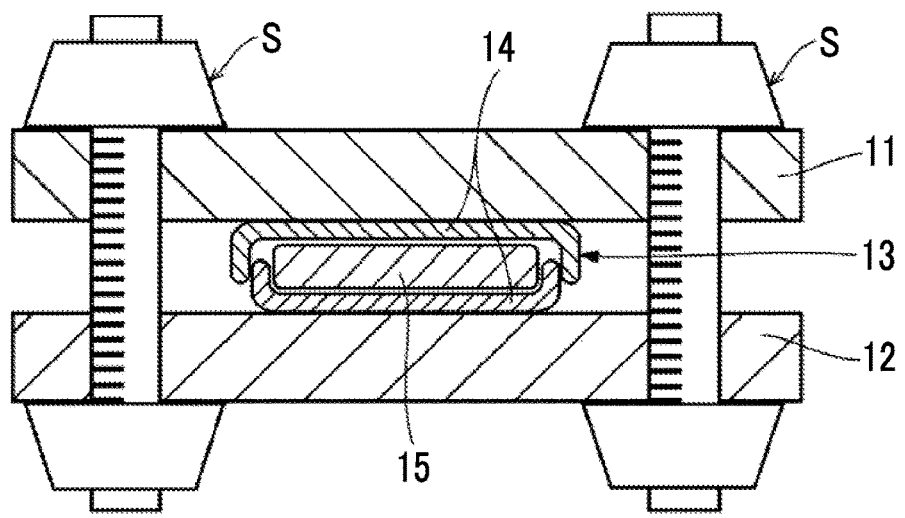
FIG. 2 is a vertical cross-sectional view schematically illustrating a device used in examples.

A disc-like piece having a diameter of 14.5 mm was cut out from the electrode sheet for an all-solid state secondary battery obtained above, and this electrode sheet for an all-solid state secondary battery 15 was put into a coin case 14 illustrated in FIG. 2. Specifically, an aluminum foil cut out to a disc shape having a diameter of 15 mm (not illustrated in FIG. 2) was brought into contact with the electrode active material layer, a spacer and a washer (both are not illustrated in FIG. 2) were combined thereinto, and the laminate was put into a stainless steel 2032-type coin case 14. The coin case was swaged with a screw S, thereby producing a sample for measuring the ion conductivity 13.

The ion conductivity was measured using the sample for measuring the ion conductivity obtained above. Specifically, the alternating-current impedance was measured in a constant-temperature tank (30° C.) using a 1255B FREQUENCY RESPONSE ANALYZER (trade name) manufactured by SOLARTRON Analytical at a voltage magnitude of 5 mV and a frequency of 1 MHz to 1 Hz. Therefore, the resistance of the specimen in the film thickness direction was obtained, the ion conductivity was computed using the following expression, and the ion conductivity was evaluated using the following evaluation standards. The evaluation standards "3" to "5" are the passing levels. The results are shown in Table 2.

Ion conductivity (mS/cm)=1000×specimen film thickness (cm)/(resistance (Ω)×specimen area (cm$^2$))

—Evaluation Standards—

5: 0.5 mS/cm≤ion conductivity
4: 0.3 mS/cm≤ion conductivity≤0.5 mS/cm
3: 0.1 mS/cm≤ion conductivity≤0.3 mS/cm
2: 0.05 mS/cm≤ion conductivity≤0.1 mS/cm
1: Ion conductivity≤0.05 mS/cm

[Test Example 3] Binding Property

A disc-shaped piece having a diameter of 15 mm was cut out from the electrode sheet for an all-solid state secondary battery, and a surface portion (observation region: 500 m×500 m) of the electrode active material layer in the cut-out sheet was observed using an optical microscope for inspection (ECLIPSE Ci (trade name), manufactured by Nikon Corporation). Specifically, the presence and absence of chips, breakages, or cracks in the electrode active material layer and the presence and absence of the peeling of the electrode active material layer from the aluminum foil (collector) were observed, and the binding property was evaluated using the following evaluation standards. The evaluation standards "2" to "5" are the passing levels. The results are shown in Table 2.

—Evaluation Standards—

5: Defects (chips, breakages, cracks, or peels) were not observed.
4: The area of a defect portion occupied more than 0% and 20% or less of the entire area of the observation region.
3: The area of a defect portion occupied more than 20% and 40% or less of the entire area of the observation region.
2: The area of a defect portion occupied more than 40% and 70% or less of the entire area of the observation region.
1: The area of a defect portion occupied more than 70% of the entire area of the observation region.

TABLE 2

| No. | Kind of electrode sheet | Solid electrolyte composition used to form electrode active material layer | Evaluation Composition Dispersion stability | Sheet Ion conductivity | Binding property | Note |
|---|---|---|---|---|---|---|
| 101 | For positive electrode | S-1 | 3 | 3 | 4 | Present Invention |
| 102 | For positive electrode | S-2 | 4 | 5 | 3 | Present Invention |
| 103 | For positive electrode | S-3 | 3 | 5 | 3 | Present Invention |
| 104 | For positive electrode | S-4 | 4 | 3 | 2 | Present Invention |
| 105 | For positive electrode | S-5 | 4 | 5 | 4 | Present Invention |
| 106 | For negative electrode | S-6 | 4 | 3 | 4 | Present Invention |
| 107 | For positive electrode | S-7 | 4 | 4 | 3 | Present Invention |
| 108 | For positive electrode | S-8 | 5 | 4 | 4 | Present Invention |
| 109 | For positive electrode | S-9 | 4 | 3 | 5 | Present Invention |
| 110 | For positive electrode | S-10 | 4 | 4 | 5 | Present Invention |
| 111 | For positive electrode | S-11 | 4 | 5 | 5 | Present Invention |
| 112 | For positive electrode | S-12 | 4 | 5 | 5 | Present Invention |
| 113 | For positive electrode | S-13 | 5 | 5 | 5 | Present Invention |
| c11 | For positive electrode | T-1 | 2 | 1 | 2 | Comparative Example |

TABLE 2-continued

| No. | Kind of electrode sheet | Solid electrolyte composition used to form electrode active material layer | Evaluation | | | Note |
|---|---|---|---|---|---|---|
| | | | Composition Dispersion stability | Sheet Ion conductivity | Binding property | |
| c12 | For positive electrode | T-2 | 1 | 3 | 3 | Comparative Example |
| c13 | For negative electrode | T-3 | 1 | 3 | 2 | Comparative Example |
| c14 | For negative electrode | T-4 | 1 | 3 | 2 | Comparative Example |

The content of the polar dispersion medium (C1) in each layer was 1 ppm or more and 10,000 ppm or less of the total mass in the layer in all of the sheets. Meanwhile, the content was measured using the above-described method.

As is clear from Table 2, the comparative solid electrolyte composition T-1 in which the active material having a surface not coated with the ion-conductive oxide was dispersed in toluene had an insufficient dispersion stability, and the ion conductivity of the electrode sheet for an all-solid state secondary battery of No. c11 produced using the above-described composition also had an insufficient ion conductivity. The comparative solid electrolyte composition T-2 of the comparative example in which the coated active material was dispersed in butyl butyrate, the comparative solid electrolyte composition T-3 of the comparative example in which the coated active material was dispersed in heptane, and the comparative solid electrolyte composition T-4 in which the active material having a surface not coated with the ion-conductive oxide was dispersed in heptane had an insufficient dispersion stability.

In contrast, all of the solid electrolyte compositions S-1 to S-13 of the embodiment of the invention in which the coated active material (B) was dispersed in the dispersion medium (C) including the polar dispersion medium (C1) had a high dispersion stability, and the ion conductivity of the electrode sheets for an all-solid state secondary battery of Nos. 101 to 113 produced using these compositions had a high ion conductivity and comprehensively had an excellent binding property.

<Production of all-Solid State Secondary Batteries>

Pieces having a diameter of 14.5 mm were cut out from the electrode sheet for a positive electrode No. 101 and the electrode sheet for a negative electrode No. 107 obtained above. The piece of the electrode sheet for a positive electrode No. 101 cut out to 14.5 mm was put into a coin cell, the LPS powder produced above (200 mg) was placed thereon, uniformly accustomed using an SUS muddler, and then pressurized at 30 MPa, thereby obtaining a composite layer in which the positive electrode layer and the LPS layer were integrated together. Furthermore, the piece of the electrode sheet for a negative electrode No. 107 cut out to 14.5 mm was placed on the LPS layer side of the composite layer and further pressurized at 100 MPa, thereby producing an all-solid state secondary battery sheet 17 of No. 201.

Figure 3:
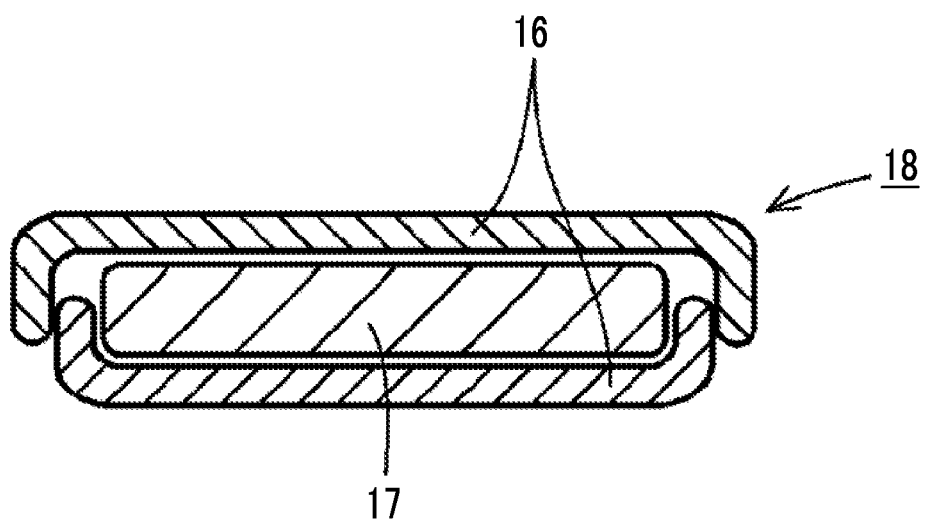
FIG. 3 is a vertical cross-sectional view schematically illustrating an all-solid state secondary battery (coin battery) produced in examples.

The all-solid state secondary battery sheet 17 of No. 201 was put into a stainless steel 2032-type coin case 16 into which a spacer and a washer (both are not illustrated in FIG. 3) were combined as illustrated in FIG. 3. This coin case was installed in a device illustrated in FIG. 2, and a screw S was swaged with a force of eight newtons (N) using a torque wrench, thereby manufacturing an all-solid state secondary battery 18 of No. 201 having a layer constitution illustrated in FIG. 1.

All-solid state secondary battery sheets and all-solid state secondary batteries of Test Nos. 202 to 212 and c21 to c23 were produced in the same manner as in the production of the all-solid state secondary battery sheet and the all-solid state secondary battery of Test No. 201 except for the fact that the electrode sheet for a positive electrode and the electrode sheet for a negative electrode shown in Table 3 were used as the positive electrode layer and the negative electrode layer.

<Evaluation>

On the all-solid state secondary batteries of the examples and the comparative examples produced above, the following tests were carried out, and the results are shown in Table 3.

[Test Example 4] Battery Voltage (Initial Voltage)

The battery voltage of the all-solid state secondary battery produced above was measured using a charging and discharging evaluation device "TOSCAT-3000 (trade name)" manufactured by Toyo System Co., Ltd.

The coin battery was charged at a current density of 2 A/m² until the battery voltage reached 4.2 V, and, once the battery voltage reached 4.2 V, the coin battery was charged with constant voltage of 4.2 V until the current density reached less than 0.2 A/m². The coin battery was discharged at a current density of 2 A/m² until the battery voltage reached 3.0 V. The above-described process was considered as one cycle, the process was repeated three cycles, and the battery voltage after a 5 mAh/g discharging in the third cycle was read and evaluated using the following standards. Meanwhile, the evaluation standards "3" to "5" are the passing levels.

—Evaluation Standards—

5: 4.0 V or more
4: 3.9 V or more and less than 4.0 V
3: 3.8 V or more and less than 3.9 V
2: 3.7 V or more and less than 3.8 V
1: Less than 3.7 V

[Test Example 5] Discharge Capacity Retention (Cycle Characteristics)

The discharge capacity retention of the all-solid state secondary battery produced above was measured using a charge and discharge evaluation device TOSCAT-3000 (trade name).

The all-solid state secondary battery was charged at a current density of 0.1 mA/cm² until the battery voltage reached 3.6 V. The all-solid state secondary battery was discharged at a current density of 0.1 mA/cm$^2$ until the battery voltage reached 2.5 V. The above-described charging and discharging were considered as one cycle, and three cycles of charging and discharging were repeated, thereby carrying out initialization. The discharge capacity at the first cycle after the initialization was considered as 100%, the all-solid state secondary battery was charged and discharged, and the cycle characteristics were evaluated from the number of cycles repeated until the discharge capacity retention reached 80% using the following standards. The evaluation standards "3" to "5" are the passing levels.

—Evaluation Standards—

5: 200 cycles or more
4: 100 cycles or more and less than 200 cycles
3: 60 cycles or more and less than 100 cycles
2: 20 cycles or more and less than 60 cycles
1: Less than 20 cycles dispersion stability, and thus the dispersibility of the respective components in the layers was poor, and the cycle characteristics were low.

In contrast, in the all-solid state secondary battery of the embodiment of the invention of No. 211 in which the negative electrode active material layer contained the sulfide-based inorganic solid electrolyte (A) having a maintained ion conductivity and the coated active material (B), compared with the comparative all-solid state secondary battery of No. c22, both the initial voltage and the cycle characteristics were more sufficient. In addition, in the all-solid state secondary battery of the embodiment of the invention of No. 212 in which the positive electrode active material layer contained the sulfide-based inorganic solid electrolyte (A) having a maintained ion conductivity and the coated active material (B), compared with the comparative all-solid state secondary battery of No. c23, both the initial voltage and the cycle characteristics were more sufficient.

TABLE 3

| | Layer constitution | | Evaluation | | |
|---|---|---|---|---|---|
| No. | Positive electrode layer | Negative electrode layer | Battery voltage | Cycle characteristics | Note |
| 201 | 101 | 106 | 3 | 4 | Present Invention |
| 202 | 102 | 106 | 5 | 4 | Present Invention |
| 203 | 103 | 106 | 5 | 4 | Present Invention |
| 204 | 104 | 106 | 3 | 4 | Present Invention |
| 205 | 105 | 106 | 4 | 3 | Present Invention |
| 206 | 109 | 106 | 3 | 5 | Present Invention |
| 207 | 110 | 106 | 4 | 4 | Present Invention |
| 208 | 111 | 106 | 5 | 5 | Present Invention |
| 209 | 112 | 106 | 5 | 5 | Present Invention |
| 210 | 113 | 106 | 5 | 5 | Present Invention |
| 211 | c12 | 106 | 3 | 3 | Present Invention |
| 212 | 101 | c14 | 3 | 3 | Present Invention |
| c21 | c11 | c13 | 1 | 2 | Comparative Example |
| c22 | c12 | c13 | 3 | 2 | Comparative Example |
| c23 | c12 | c14 | 2 | 2 | Comparative Example |

As is clear from Table 3, in the comparative all-solid state secondary battery of No. c21, the initial voltage and the cycle characteristics were insufficient. It is considered that, in the comparative all-solid state secondary battery of No. c21, the positive electrode active material layer contained the active material having a surface not coated with the ion-conductive oxide, and thus a high-resistance layer was formed during the operation of the all-solid state secondary battery, and, the positive electrode active material layer and the negative electrode active material layer were produced from the solid electrolyte compositions T-1 and T-3 having an insufficient dispersion stability, and thus the dispersibility of the respective components in the layers was poor, and both the initial battery voltage and the cycle characteristics were low.

In addition, in the comparative all-solid state secondary battery of No. c22, the cycle characteristics were insufficient. It is considered that, in the comparative all-solid state secondary battery of No. c22, the positive electrode active material layer and the negative electrode active material layer were produced from the solid electrolyte compositions T-2 and T-3 having an insufficient dispersion stability, and thus the dispersibility of the respective components in the layers was poor, and the cycle characteristics were low. In the comparative all-solid state secondary battery of No. c23, the positive electrode active material layer and the negative electrode active material layer were produced from the solid electrolyte compositions T-2 and T-4 having an insufficient Particularly, the all-solid state secondary batteries of the embodiment of the invention of Nos. 201 to 210 were sufficient in terms of both the initial voltage and the cycle characteristics. This is considered that the positive electrode active material layer and the negative electrode active material layer contained the sulfide-based inorganic solid electrolyte (A) having a maintained ion conductivity and the coated active material (B) as a result of the suppression of decomposition, and furthermore, these components were present in the layers in a well-dispersed manner, and thus the performance of the all-solid state secondary batteries was comprehensively improved.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

EXPLANATION OF REFERENCES

1: negative electrode collector
2: negative electrode active material layer
3: solid electrolyte layer
4: positive electrode active material layer
5: positive electrode collector
6: operation portion 10: all-solid state secondary battery
11: upper portion-supporting plate
12: lower portion-supporting plate
13: all-solid state secondary battery (sample for ion conductivity measurement)
14: coin case
15: electrode sheet for all-solid state secondary battery (sample sheet for measurement)
S: screw
16: 2032-type coin case
17: all-solid state secondary battery sheet
18: all-solid state secondary battery

What is claimed is:

1. A solid electrolyte composition comprising:
(A) a sulfide-based inorganic solid electrolyte having a conductivity of an ion of a metal belonging to Group I or II of the periodic table;
(B) an active material having a surface coated with an oxide having an ion conductivity; and
(C) a dispersion medium,
wherein the dispersion medium (C) includes a polar dispersion medium (C1) satisfying the following conditions 1 and 2,
<condition 1>
the polar dispersion medium has at least one polar group selected from the following group of polar groups,
<group of polar groups>
a hydroxy group, an ether group, an amino group, an amide group, an ester group, a carbonyl group, a carbonate group, a carboxy group, and a cyano group, and
<condition 2>
at least one of substituents that are bonded to the polar group is a hydrocarbon group having a branched structure.

2. The solid electrolyte composition according to claim 1, wherein the polar dispersion medium (C1) is an alicyclic compound.

3. The solid electrolyte composition according to claim 1, wherein the polar dispersion medium (C1) is represented by Formula (1), $$R^1\text{—}X\text{—}R^2 \quad (1)$$

in the formula, X represents —O—, —S—, —NR³—, —C(=O)—, —C(=O)O—, or —C(=O)NR⁴—, $R^1$ and $R^2$ each independently represent a hydrogen atom or a hydrocarbon group, here, at least one of $R^1$ or $R^2$ is a hydrocarbon group having a branched structure, $R^1$ and $R^2$ may be bonded to each other to form a ring, and $R^3$ and $R^4$ each independently represent a hydrogen atom, an alkyl group, or an aryl group.

4. The solid electrolyte composition according to claim 3, wherein the polar dispersion medium (C1) is represented by Formula (2),

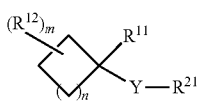

in the formula, Y represents —O—, —S—, —NR¹³—, —C(=O)—, —C(=O)O—, or —C(=O)NR¹⁴—, $R^{11}$ represents a hydrogen atom or an alkyl group, $R^{12}$ represents an alkyl group, $R^{21}$ represents a hydrogen atom or an alkyl group, n is an integer of 0 to 5, m is an integer of 0 to 2n+4, in a case in which there is a plurality of $R^{12}$'s, the plurality of $R^{12}$'s may be identical to or different from each other, and $R^{13}$ and $R^{14}$ each independently represent a hydrogen atom, an alkyl group, or an aryl group.

5. The solid electrolyte composition according to claim 1, wherein a boiling point at 1,013 hPa of the polar dispersion medium (C1) is 100° C. or higher and 180° C. or lower.

6. The solid electrolyte composition according to claim 1, further comprising:
a binder (D).

7. The solid electrolyte composition according to claim 1, further comprising:
a conductive auxiliary agent (E).

8. The solid electrolyte composition according to claim 6, wherein the binder (D) is at least one of an acrylic resin, a polyurethane resin, a polyurea resin, a polyimide resin, a polyamide resin, a polyether resin, a polycarbonate resin, a fluorine-containing resin, or a hydrocarbon-based thermoplastic resin.

9. The solid electrolyte composition according to claim 6, wherein the binder (D) has a polar group (a).

10. The solid electrolyte composition according to claim 6, wherein the binder (D) is particles having an average particle diameter of 10 to 1,000 nm.

11. A solid electrolyte-containing sheet comprising:
a layer containing (A) a sulfide-based inorganic solid electrolyte having a conductivity of an ion of a metal belonging to Group I or II of the periodic table, (B) an active material having a surface coated with an oxide having an ion conductivity, and a polar dispersion medium (C1) satisfying the following conditions 1 and 2,
wherein a content of the polar dispersion medium (C1) in the layer is 1 ppm or more and 10,000 ppm or less,
<condition 1>
the polar dispersion medium has at least one polar group selected from the following group of polar groups,
<group of polar groups>
a hydroxy group, an ether group, an amino group, an amide group, an ester group, a carbonyl group, a carbonate group, a carboxy group, and a cyano group, and
<condition 2>
at least one of substituents that are bonded to the polar group is a hydrocarbon group having a branched structure.

12. A method for manufacturing a solid electrolyte-containing sheet, the method comprising:
a step of applying the solid electrolyte composition according to claim 1 onto a base material to form a coated film.

13. An all-solid state secondary battery comprising:
a positive electrode active material layer;
a negative electrode active material layer; and
a solid electrolyte layer,
wherein at least one layer of the positive electrode active material layer or the negative electrode active material layer is the solid electrolyte-containing sheet according to claim 11.

14. A method for manufacturing an all-solid state secondary battery, the method comprising:
    manufacturing an all-solid state secondary battery through the manufacturing method according to claim 12.

* * * * *